(12) United States Patent
Eriksen et al.

(10) Patent No.: US 8,659,307 B2
(45) Date of Patent: Feb. 25, 2014

(54) CAPACITIVE SENSORS FOR MONITORING LOAD BEARING ON PINS

(75) Inventors: Harald Eriksen, Minneapolis, MN (US); Alexander Spivak, Eden Prairie, MN (US); Christopher Sanden, Bloomington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 609 days.

(21) Appl. No.: 12/857,793

(22) Filed: Aug. 17, 2010

(65) Prior Publication Data

US 2012/0043978 A1 Feb. 23, 2012

(51) Int. Cl.
*G01R 27/26* (2006.01)

(52) U.S. Cl.
USPC .......................................................... 324/690

(58) Field of Classification Search
USPC .................................. 324/690, 658, 661, 686
See application file for complete search history.

(56) References Cited

U.S. PATENT DOCUMENTS

| | | | |
|---|---|---|---|
| 2,968,031 A | | 1/1961 | Higa |
| 3,577,883 A | * | 5/1971 | Werner ............................ 73/768 |
| 3,783,496 A | | 1/1974 | Siler |
| 4,114,428 A | * | 9/1978 | Popenoe ........................... 73/761 |
| RE30,183 E | * | 1/1980 | Popenoe ........................... 73/761 |
| 4,197,753 A | * | 4/1980 | Harting et al. .................. 73/766 |
| 4,269,070 A | | 5/1981 | Nelson et al. |
| 4,312,042 A | | 1/1982 | Bateman |
| 4,480,480 A | | 11/1984 | Scott et al. |
| 4,651,402 A | | 3/1987 | Bonfils |
| 4,850,552 A | | 7/1989 | Darden et al. |
| 5,010,775 A | | 4/1991 | Choisnet |
| 5,205,514 A | | 4/1993 | Patzig et al. |
| 5,314,115 A | | 5/1994 | Moucessian |
| 5,358,637 A | | 10/1994 | Hutzler et al. |
| 5,388,463 A | * | 2/1995 | Scott ................................ 73/761 |

(Continued)

FOREIGN PATENT DOCUMENTS

| | | |
|---|---|---|
| DE | 3239877 A1 | 5/1984 |
| DE | 4035197 A1 | 1/1992 |

(Continued)

OTHER PUBLICATIONS

Free Dictionary definition of "pin" http://www.thefreedictionary.com/PIN.*

(Continued)

*Primary Examiner* — Jermele M Hollington
*Assistant Examiner* — Demetrius Pretlow
(74) *Attorney, Agent, or Firm* — Snell & Wilmer, L.L.P.

(57) ABSTRACT

A sensor for monitoring external loads acting on a pin assembly includes a pin having an axial interior bore defined therein and having a length defined from a first end to an opposed second end thereof. A core pin is mounted axially within the interior bore of the pin spaced radially inwardly from the interior bore for relative displacement with respect to the pin. A capacitor is provided having an inner capacitor plate mounted to the core pin, and an outer capacitor plate mounted to the pin, such that relative displacement of the core and the pin due to external loading on the pin results in relative displacement of the inner and outer capacitor plates. The capacitor is configured and adapted to be connected to an electrical circuit to produce signals indicative of external loading on the pin based on relative displacement of the inner and outer capacitor plates.

11 Claims, 18 Drawing Sheets

(56) References Cited

U.S. PATENT DOCUMENTS

| | | | |
|---|---|---|---|
| 5,392,654 A * | 2/1995 | Boyle | 73/761 |
| 5,446,666 A | 8/1995 | Bauer | |
| 5,477,740 A | 12/1995 | Shioya et al. | |
| 5,518,206 A | 5/1996 | Arnold et al. | |
| 5,815,091 A | 9/1998 | Dames et al. | |
| 6,204,771 B1 * | 3/2001 | Ceney | 340/665 |
| 6,289,289 B1 | 9/2001 | Zweifel | |
| 6,334,588 B1 | 1/2002 | Porte | |
| 6,354,152 B1 * | 3/2002 | Herlik | 73/597 |
| 6,536,292 B1 * | 3/2003 | Richards et al. | 73/862.041 |
| 6,581,481 B1 * | 6/2003 | Perusek | 73/862.337 |
| 6,676,075 B2 | 1/2004 | Cowan et al. | |
| 6,745,153 B2 | 6/2004 | White et al. | |
| 6,880,784 B1 | 4/2005 | Wilkinson et al. | |
| 6,902,136 B2 | 6/2005 | Mackness | |
| 6,951,145 B2 | 10/2005 | Kilmartin | |
| 6,959,497 B2 | 11/2005 | Leidinger | |
| 7,208,945 B2 | 4/2007 | Jones et al. | |
| 7,589,645 B2 | 9/2009 | Schmidt | |
| 7,680,630 B2 | 3/2010 | Schmidt | |
| 7,843,363 B2 | 11/2010 | Grichener et al. | |
| 8,359,932 B2 * | 1/2013 | Eriksen et al. | 73/856 |
| 2002/0199131 A1 | 12/2002 | Kocin | |
| 2003/0172740 A1 * | 9/2003 | Stevenson et al. | 73/794 |
| 2003/0209063 A1 | 11/2003 | Adamson et al. | |
| 2004/0011596 A1 | 1/2004 | Miller et al. | |
| 2004/0012212 A1 | 1/2004 | Pratt et al. | |
| 2004/0075022 A1 | 4/2004 | MacKness | |
| 2004/0102918 A1 | 5/2004 | Stana | |
| 2004/0129834 A1 | 7/2004 | Luce | |
| 2004/0225474 A1 | 11/2004 | Goldfine et al. | |
| 2005/0030010 A1 | 2/2005 | Jones et al. | |
| 2006/0004499 A1 | 1/2006 | Trego et al. | |
| 2006/0038410 A1 | 2/2006 | Pratt et al. | |
| 2007/0006662 A1 | 1/2007 | Giazotto | |
| 2009/0132129 A1 * | 5/2009 | Breed | 701/45 |
| 2009/0173823 A1 | 7/2009 | Shetzer | |
| 2009/0183561 A1 * | 7/2009 | Gregory et al. | 73/129 |
| 2010/0026482 A1 * | 2/2010 | Grichener et al. | 340/539.1 |
| 2011/0018741 A1 * | 1/2011 | Grichener et al. | 340/971 |
| 2012/0011946 A1 | 1/2012 | Eriksen et al. | |
| 2012/0012700 A1 | 1/2012 | Eriksen et al. | |
| 2012/0012701 A1 | 1/2012 | Eriksen et al. | |
| 2012/0053784 A1 | 3/2012 | Schmidt et al. | |

FOREIGN PATENT DOCUMENTS

| | | |
|---|---|---|
| EP | 0072634 A1 | 2/1983 |
| EP | 1839984 A1 | 10/2007 |
| GB | 2226416 A | 6/1990 |
| SU | 1469339 A1 | 3/1989 |
| WO | WO-0212043 A1 | 2/2002 |
| WO | WO-2004013785 A2 | 2/2004 |
| WO | WO-2006067442 A1 | 6/2006 |

OTHER PUBLICATIONS

Extended Search Report issued Feb. 8, 2012 in connection with EP Application No. 11250852.8.

Extended Search Report issued Feb. 4, 2010 in connection with European Patent Application No. 05808070.6.

Office Action issued Feb. 3, 2012 in connection with U.S. Appl. No. 13/271,468.

Partial Search Report issued Nov. 2, 2011 in connection with European Patent Application No. 11250645.6.

Office Action issued Mar. 19, 2012 in connection with U.S. Appl. No. 12/839,401.

Extended Search Report issued Mar. 15, 2012 in connection with European Patent Application No. 11250645.6.

Partial Search Report issued Nov. 2, 2011 in connection with European Patent Application No. 11250647.2.

Extended Search Report issued Mar. 15, 2012 in connection with European Patent Application No. 11250647.2.

First Action Pre-Interview Communication issued May 30, 2012 in connection with U.S. Appl. No. 12/839,216.

* cited by examiner

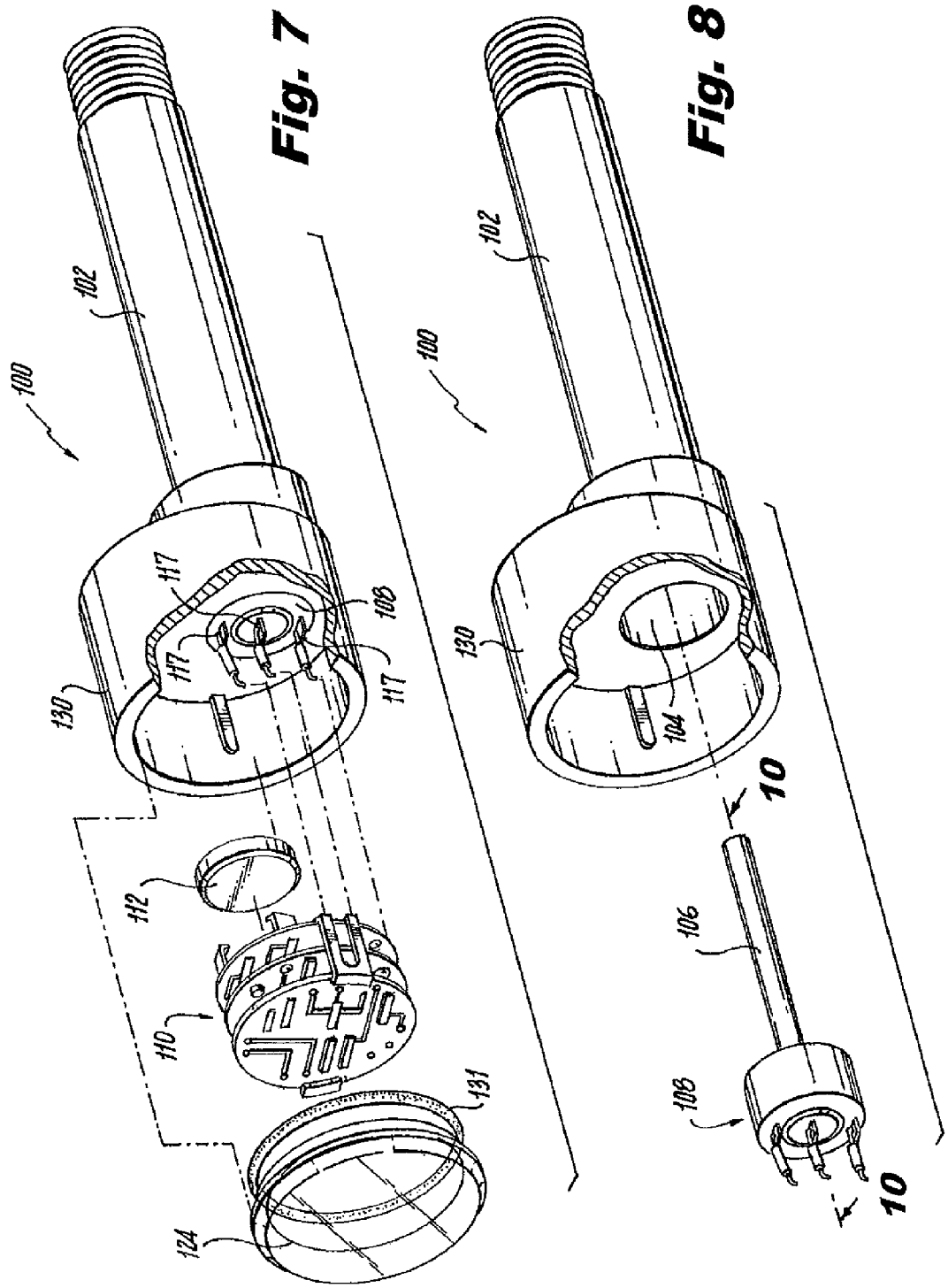

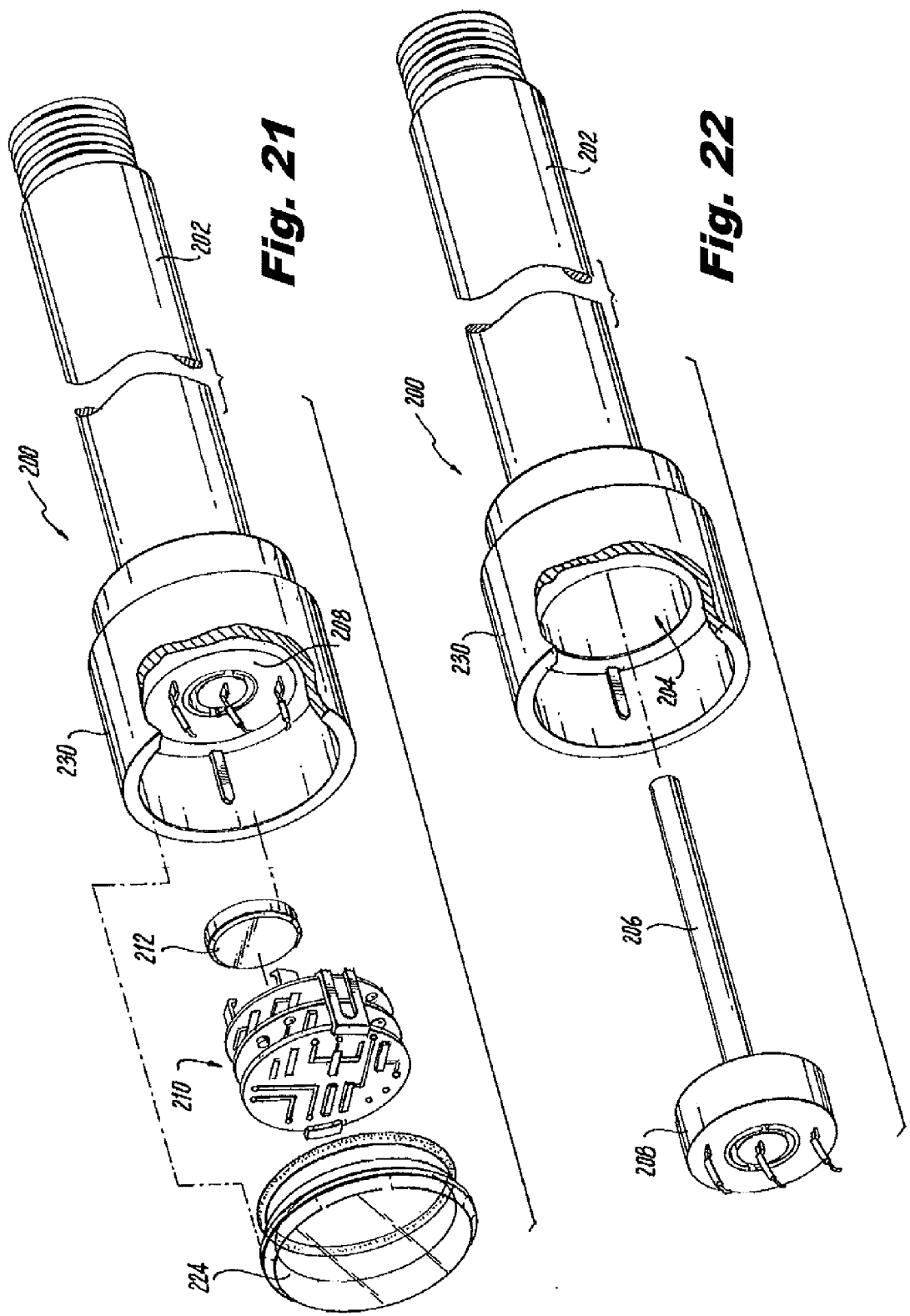

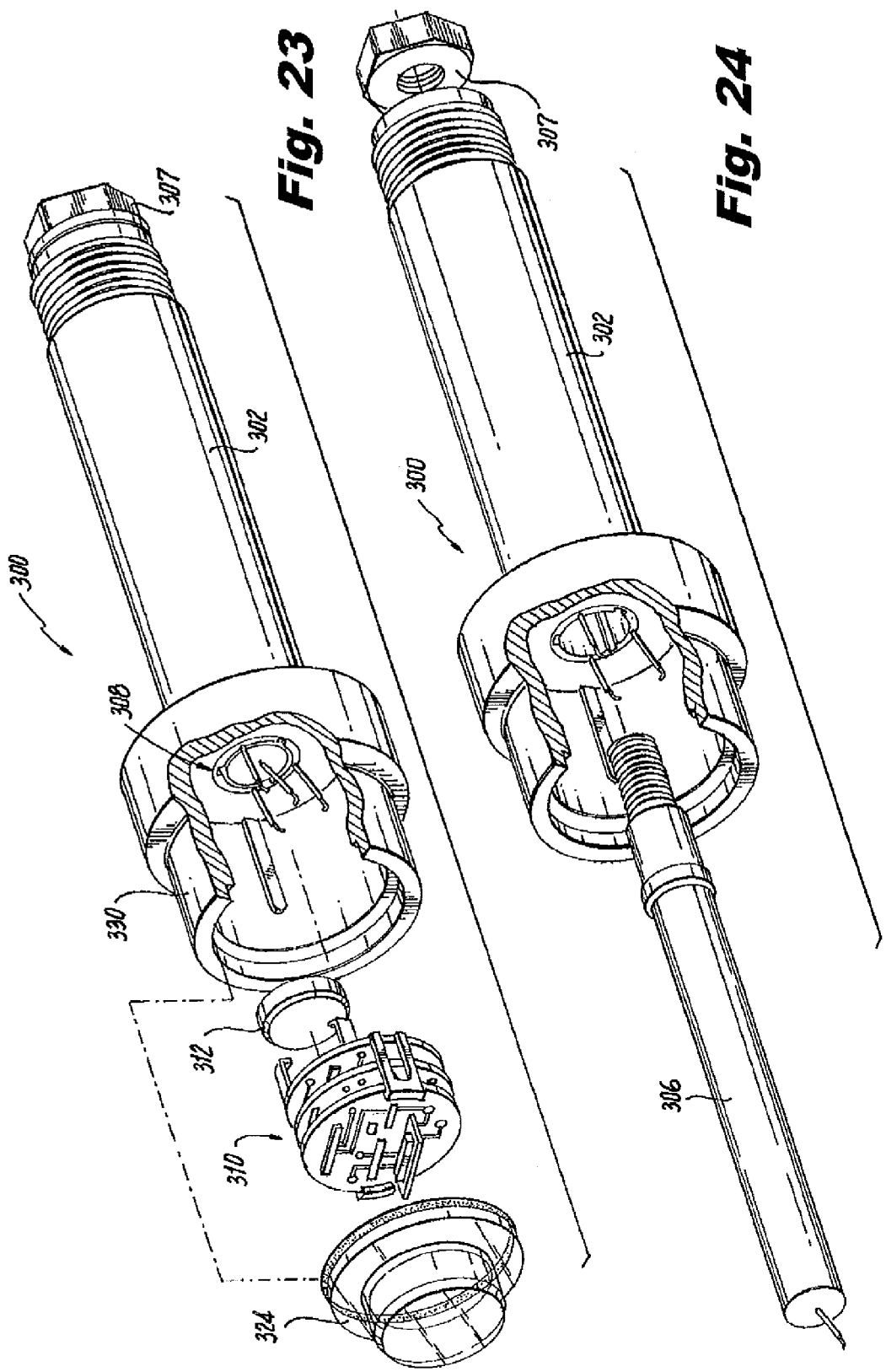

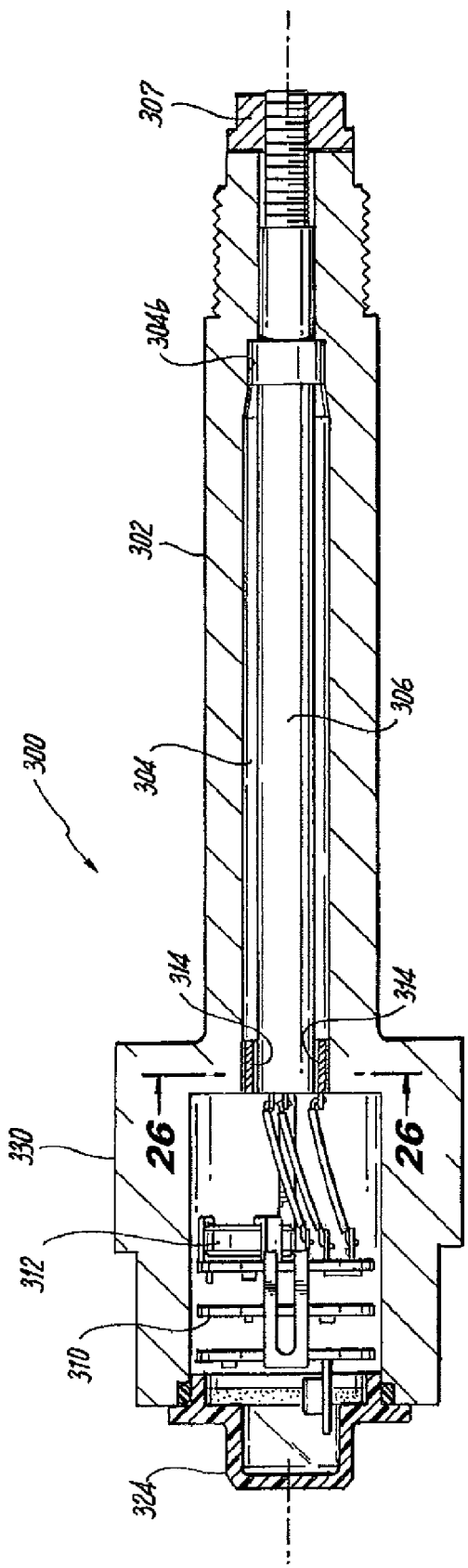
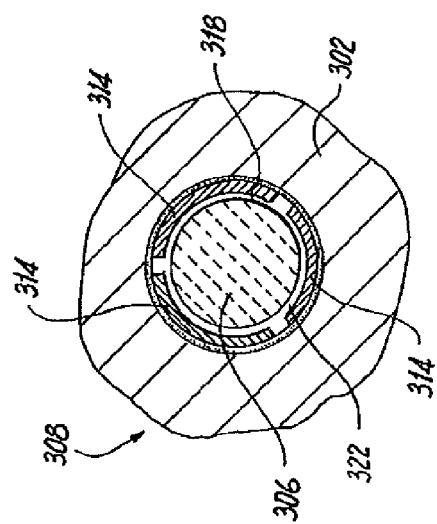
Fig. 25
Fig. 26

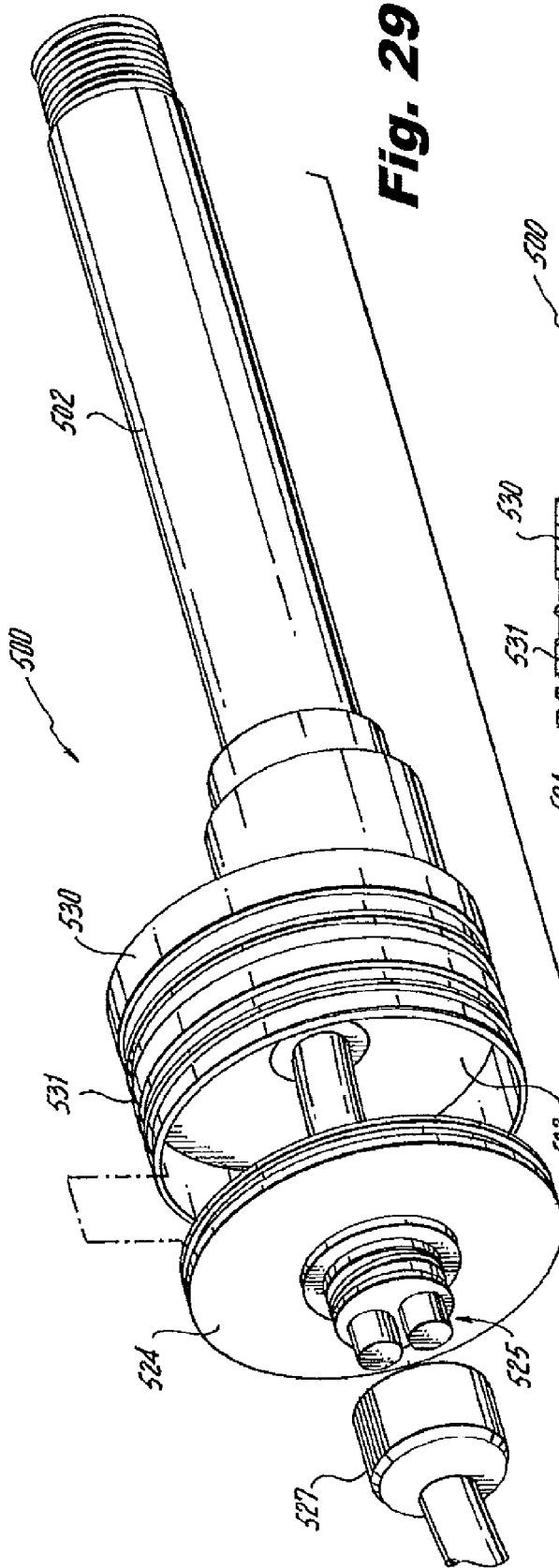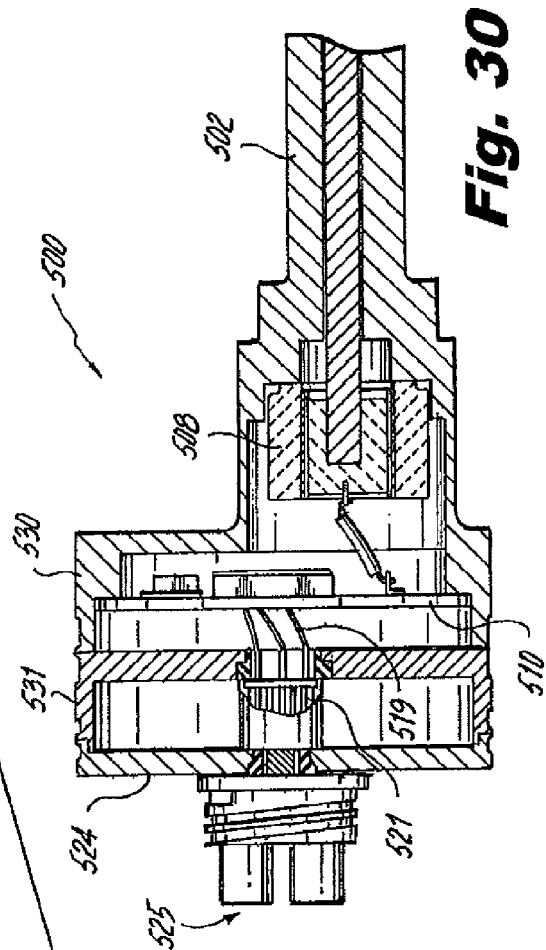

CAPACITIVE SENSORS FOR MONITORING LOAD BEARING ON PINS

BACKGROUND OF THE INVENTION

1. Field of the Invention

The present invention relates to sensors for detecting loads on pins. More particularly, the present invention is directed to sensors for detecting when latches for securing aircraft engine cowls are secured.

2. Description of Related Art

A variety of devices and methods are known in the art for detecting whether an aircraft latch is in a secured state. Of such devices, many are directed to determining whether an aircraft latch for securing an engine cowl is in a secured state.

A typical aircraft 10 having two engines 12 is shown in FIG. 1 with its engine cowls closed. Opening the cowls, e.g. cowl 14 shown in FIG. 2, allows the engines to be serviced and maintained. However, failure to re-secure the cowls after opening them can lead to malfunction of the cowls during take-off or flight. In some circumstances, the cowls can be blown off from the aircraft completely. Fortunately, the loss of an engine cowl is not generally a serious threat to an aircraft. It is nonetheless advantageous to reduce the number of cowl incidents. Typically, the onus is on ground personnel to verify that all engine cowls are secured before an aircraft pulls away from its gate. It is believed that the prevailing cause of engine cowl incidents is failure of ground crew to securely latch engine cowls prior to departure.

Efforts have been made to assist ground crews in verifying engine cowls are secured. U.S. Pat. No. 6,334,588 to Porte describes a system for securing fan cowls in which a maintenance crew can visually detect an unsecured fan cowl because edges of unsecured fan cowls protrude enough to allow for visual detection. Another visual technique for detecting unsecured cowls is described in U.S. Pat. No. 5,518,206 to Arnold et al., which describes an apparatus that extends a flag visible to ground crew when an engine cowl is unsecured.

Other efforts have been made in creating systems to inform operators whether an engine cowl is secured or not by means of sensors. U.S. Patent Application No. 2006/0038410 to Pratt et al. describes a latch having sensors to assist controlling an electrical motor, which operates to open and close a latch for a fan cowl. The sensors can also inform a controller as to the status of the latch.

Such conventional methods and systems generally have been considered satisfactory for their intended purpose. However, while visual cues make it easier to verify that an engine cowl is securely latched, these techniques still rely on the ground crew to remember to check the latches. Although solutions to this problem have been developed, such as by using sensors to detect the state of a cowl latch, as in the stress sensors in the latch mechanism disclosed in U.S. Patent Application No. 2004/0012212 to Pratt et al., there still remains a continued need in the art for a latch sensor that is more sensitive, reliable, and easier to change out for replacement. There also remains a need in the art for a system of latch detection that is inexpensive and easy to make and use, including retrofitting existing latches without substantial alterations. The present invention provides a solution for these problems.

SUMMARY OF THE INVENTION

The subject invention is directed to a new and useful sensor for monitoring external loads acting on a pin assembly. The sensor includes a pin having an axial interior bore defined therein and having a length defined from a first end to an opposed second end thereof. A core pin is mounted axially within the interior bore of the pin and is spaced radially inwardly from the interior bore for relative displacement with respect to the pin. A capacitor is provided having an inner capacitor plate mounted to the core pin, and an outer capacitor plate mounted to the pin, such that relative displacement of the core and the pin due to external loading on the pin results in relative displacement of the inner and outer capacitor plates. The capacitor is configured and adapted to be connected to an electrical circuit to produce signals indicative of external loading on the pin based on relative displacement of the inner and outer capacitor plates.

In certain embodiments, the interior bore extends only along a portion of the length of the pin. The core pin can be mounted to the interior bore in an intermediate portion of the pin between the first and second ends thereof. The capacitor can be located proximate one end of the pin.

In accordance with certain embodiments, the interior bore extends through the entire length of the pin. The core pin can be mounted to the interior bore proximate the first end of the pin. The capacitor can be located proximate the second end of the pin.

It is contemplated that the core pin can be cantilevered within the interior bore of the pin. The outer capacitor plate can be substantially semi-cylindrical in cross-section and can be substantially aligned axially with the inner capacitor plate.

In certain embodiments, the sensor further includes a second outer capacitor plate mounted to the pin. The outer capacitor plates can be substantially semi-cylindrical and can be substantially aligned circumferentially and axially. The second outer capacitor plate is configured and adapted to be connected to an electrical circuit to produce signals indicative of external loading on the pin based on the relative displacement of the core pin and the pin. The electrical circuit can be configured to constructively combine the signals from the two capacitors, reading the signals differentially for added sensitivity and accuracy.

In accordance with certain exemplary embodiments, the sensor includes a second outer capacitor plate and a third outer capacitor plate. Each of the second and third outer capacitor plates is mounted to the pin. The three outer capacitor plates are each substantially aligned axially with the inner capacitor plate. Each of the three outer capacitor plates is configured and adapted to be connected to an electrical circuit to produce signals indicative of external loading on the pin based on the relative displacement of the core pin and the pin. The outer capacitor plates can be spaced apart substantially evenly circumferentially. The electrical circuit can be configured to produce signals indicative of magnitude and direction of a load acting on the pin based on the relative displacement of the core pin and the pin. It is contemplated that three, four, five, or any suitable number outer capacitor plates can be used.

It is contemplated that the sensor can further include an electronics housing on an end of the pin proximate the capacitor for holding electronic components in electrical communication with the capacitor. The electronics housing can be concentric with respect to the axial interior bore of the pin, or can be eccentric with respect to the axial interior bore of the pin as needed for spatial considerations in given applications.

In accordance with certain embodiments, the core pin is metal and is mounted to the axial interior bore of the pin with a press fit. Furthermore, the inner capacitor element may be ceramic, or of any other suitable insulating material, bonded to the core pin by adhesives such as epoxy, polyacrylate, or other suitable bonding adhesives, braze, and/or any other suitable method of permanent attachment. It is contemplated that the sensor can include a ceramic, or other suitable insulating material, ring mounted to the pin, and that the outer capacitor plate or plates can be mounted or incorporated into the ceramic ring.

The invention also provides a latch for securing an engine nacelle on a gas turbine engine. The latch includes a latch pin mounted in a latch clevis. The pin has an axial interior bore defined therein and has a length defined from a first end to an opposed second end thereof. A latch hook is operatively connected to the latch clevis for engaging the latch pin to secure the latch and for disengaging the latch pin to release the latch. A core pin is mounted axially within the interior bore of the latch pin and is spaced radially inwardly from the interior bore for relative displacement with respect to the latch pin. The sensor includes a capacitor having an inner capacitor plate mounted to the core pin, and an outer capacitor plate mounted to the latch pin, such that relative displacement of the core and the latch pin due to engagement of the latch hook with the latch pin results in relative displacement of the inner and outer capacitor plates. The capacitor is configured and adapted to be connected to an electrical circuit to produce signals indicative of the latch hook engaging the latch pin based on the relative displacement of the inner and outer capacitor plates.

The invention also provides a system for sensing external loads acting on a pin assembly. The system includes a pin having an axial interior bore defined therein and having a length defined from a first end to an opposed second end thereof. A core pin is mounted axially within the interior bore of the pin and is spaced radially inwardly from the interior bore for relative displacement with respect to the pin. A capacitor is provided having an inner capacitor plate mounted to the core pin, and an outer capacitor plate mounted to the pin, such that relative displacement of the core pin and the pin due to external loading on the pin results in relative displacement of the inner and outer capacitor plates. An electrical circuit is electrically connected to the inner and outer capacitor plates to produce signals indicative of external loading on the pin based on the relative displacement of the inner and outer capacitor plates. In wireless embodiments, a battery is electrically connected to the electrical circuit to provide power thereto. A transmitter is electrically connected to the electrical circuit to transmit the signals indicative of external loading on the pin. In wired embodiments, a connector mounted in an end of the pin can be interfaced with a cable to power the electrical circuit and/or convey sensor signals.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 7 is a partially cut away exploded view of the sensor of FIG. 5, showing the electronics housing with the electronics removed;

FIG. 8 is a partially cut away exploded view of a portion of the sensor of FIG. 5, showing the core pin and capacitor removed from the axial interior bore;

FIG. 21 is a partially cut away exploded view of another exemplary embodiment of a sensor constructed in accordance with the present invention, showing the electronics housing with the electronics removed, wherein the electronics housing is oriented coaxially with the pin;

FIG. 22 is a partially cut away exploded view of a portion of the sensor of FIG. 21, showing the core pin and capacitor removed from the axial interior bore;

FIG. 23 is a partially cut away exploded view of another exemplary embodiment of a sensor constructed in accordance with the present invention, showing the electronics housing with the electronics removed;

FIG. 24 is a partially cut away exploded view of a portion of the sensor of FIG. 23, showing the core pin removed from the longitudinal bore;

FIG. 25 is a cross-sectional side elevation view of the sensor of FIG. 23, showing the core pin extending along the full length of the internal bore of the pin;

FIG. 26 is a cross-sectional end view of a portion of the sensor of FIG. 23, showing three evenly spaced outer capacitor plates in the capacitor;

FIG. 29 is an exploded perspective view of another exemplary embodiment of a sensor constructed in accordance with the subject invention, showing a wired version of the sensor for providing power and signal transmission via wire; and FIG. 30 is a cross-sectional side elevation view of a portion of the sensor of FIG. 29, showing a wired connector electrically coupled to the circuitry through the hermetically sealed bulkhead.

DETAILED DESCRIPTION OF THE PREFERRED EMBODIMENTS

Figure 5:
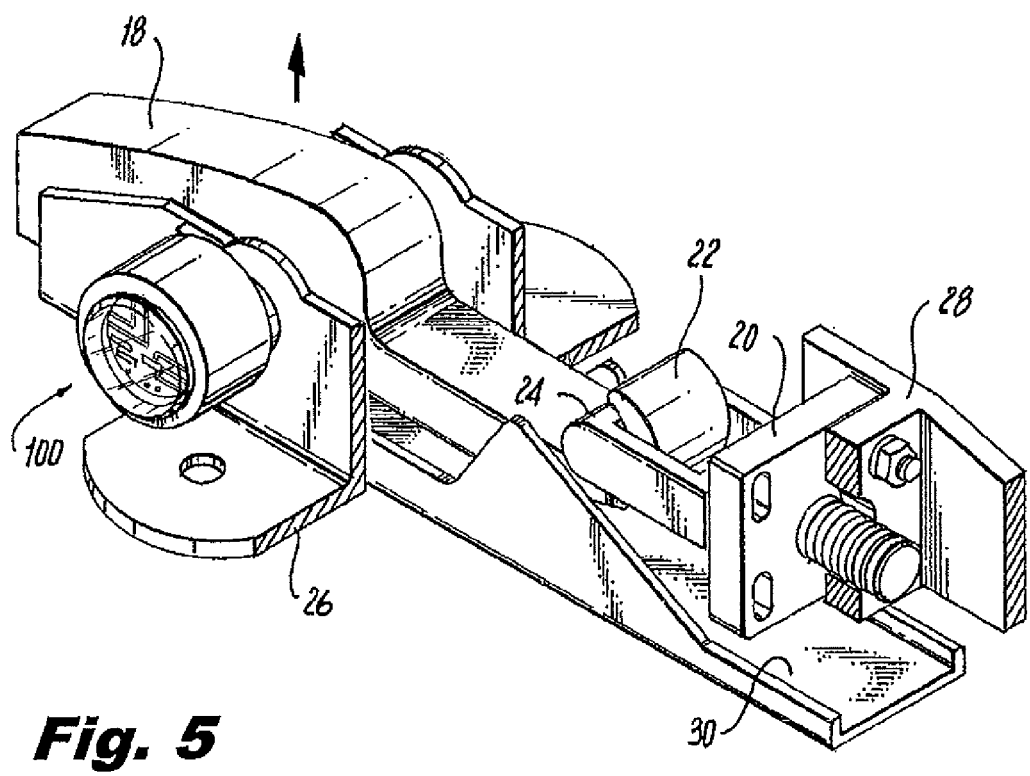
FIG. 5 is a partially cut away perspective view of an exemplary embodiment of a latch assembly and sensor constructed in accordance with the present invention, showing the sensor mounting the latch component to its clevis, wherein part of the clevis components are cut away for clarity.

Reference will now be made to the drawings wherein like reference numerals identify similar structural features or aspects of the subject invention. For purposes of explanation and illustration, and not limitation, a partial view of an exemplary embodiment of a sensor in accordance with the invention is shown in FIG. 5 and is designated generally by reference character 100. Other embodiments of sensors in accordance with the invention, or aspects thereof, are provided in FIGS. 1-4 and 6-26, as will be described. The system of the invention can be used in general for monitoring external loads acting on a pin assembly, and in particular for detecting the state of a latch, such as the secured or unsecured state of a latch of an aircraft engine cowl.

Figure 1:
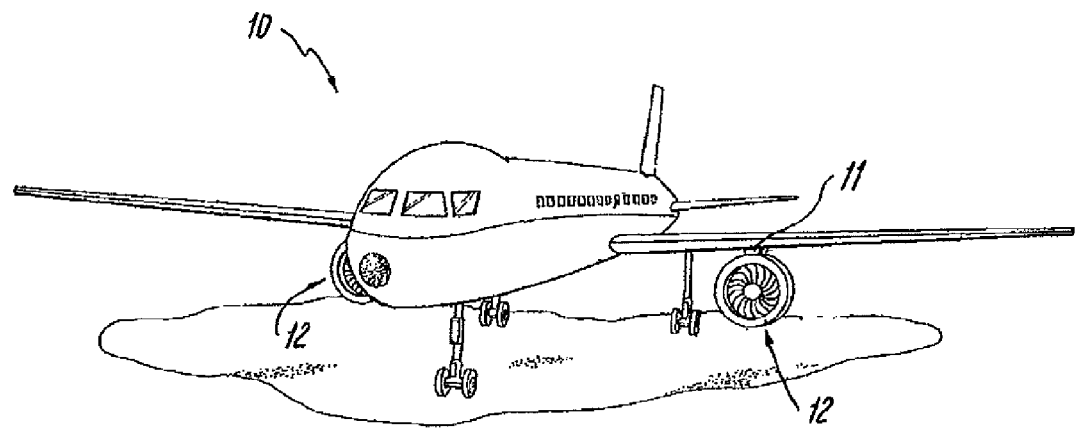
FIG. 1 is a perspective view of an aircraft, showing the engines with the engine cowls closed.
Figure 2:
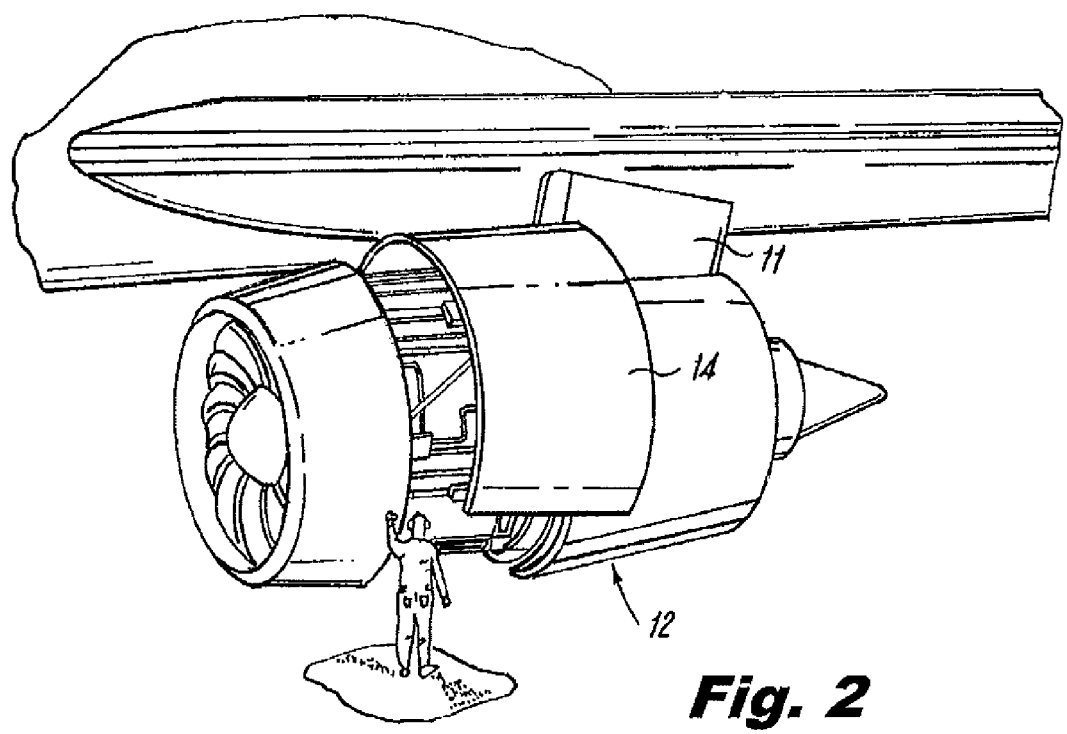
FIG. 2 is a perspective view of an aircraft engine showing a cowl door in the open position with a ground crew member accessing the engine.
Figure 3:
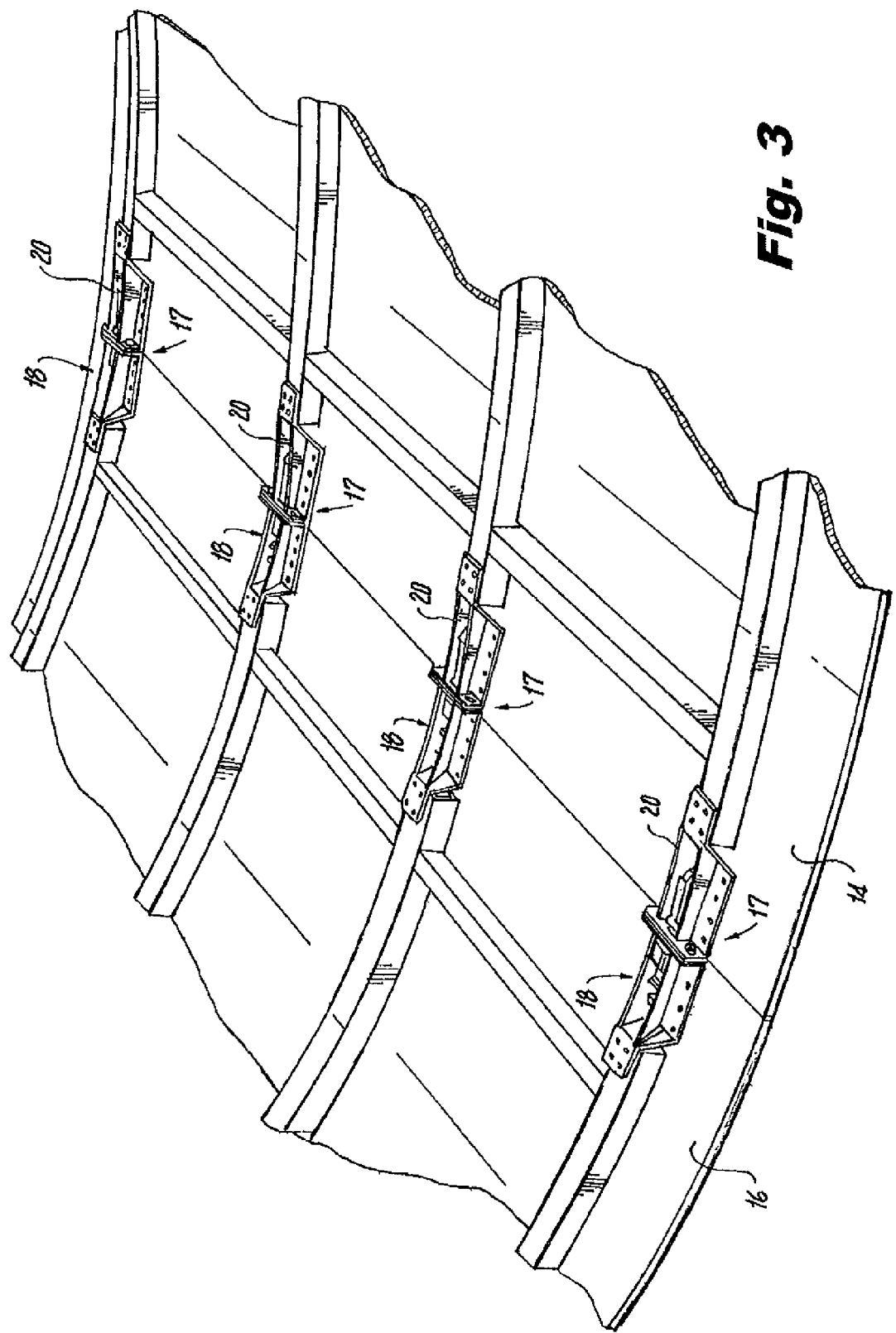
FIG. 3 is a perspective interior view of engine cowl doors, showing the cowl doors secured by four latch assemblies.
Figure 4:
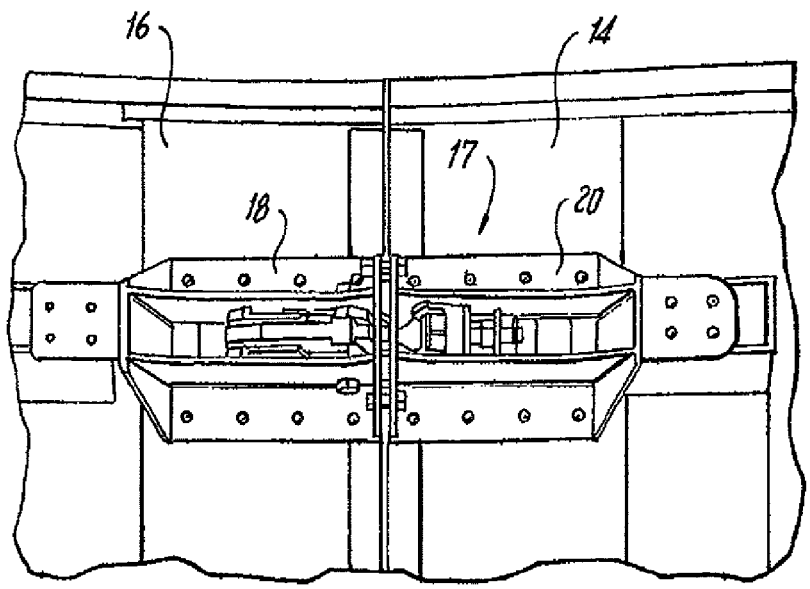
FIG. 4 is a perspective view of a latch assembly, showing the latch in the secure position securing two cowl doors.

FIGS. 1-4 show an aircraft 10 with engine 12, each attached to a pylon 11 under a wing. Each engine 12 includes two cowl sections 14 and 16 of a fan cowl assembly that can be opened to allow access to components inside engine 12, as shown in FIG. 2. FIG. 2 shows an aircraft engine 12 with an engine cowl 14 open. Cowls 14 and 16 can be hinged open by releasing latch 18 from a stationary keeper or pin component 20. It is also common for pin component 20 to be attached to one cowl section (e.g. 14) with a corresponding latch 18 attached to the opposite cowl section (e.g. 16). Multiple latch assemblies 17 can be used to secure a pair of cowl sections, as shown in FIG. 3.

Referring now to FIG. 5, a sensor 100 is provided for detecting engagement of latch 18 and pin component 20. In FIG. 5, hook 22 of latch 18 is secured to pin 24 of pin component 20 to securely latch the cowl sections (not shown in FIG. 5, but see cowls 14 and 16 in FIG. 4). Hook 22 and pin component 24 are each connected to a respective bracket (26 and 28, respectively) and each bracket 26, 28 is secured to a cowl section 14, 16. Latch 18 is a typical over-center latch that can be actuated by movement of a handle 30 to release hook 22 from pin 24 in order to open cowl sections 14, 16.

Figure 6:
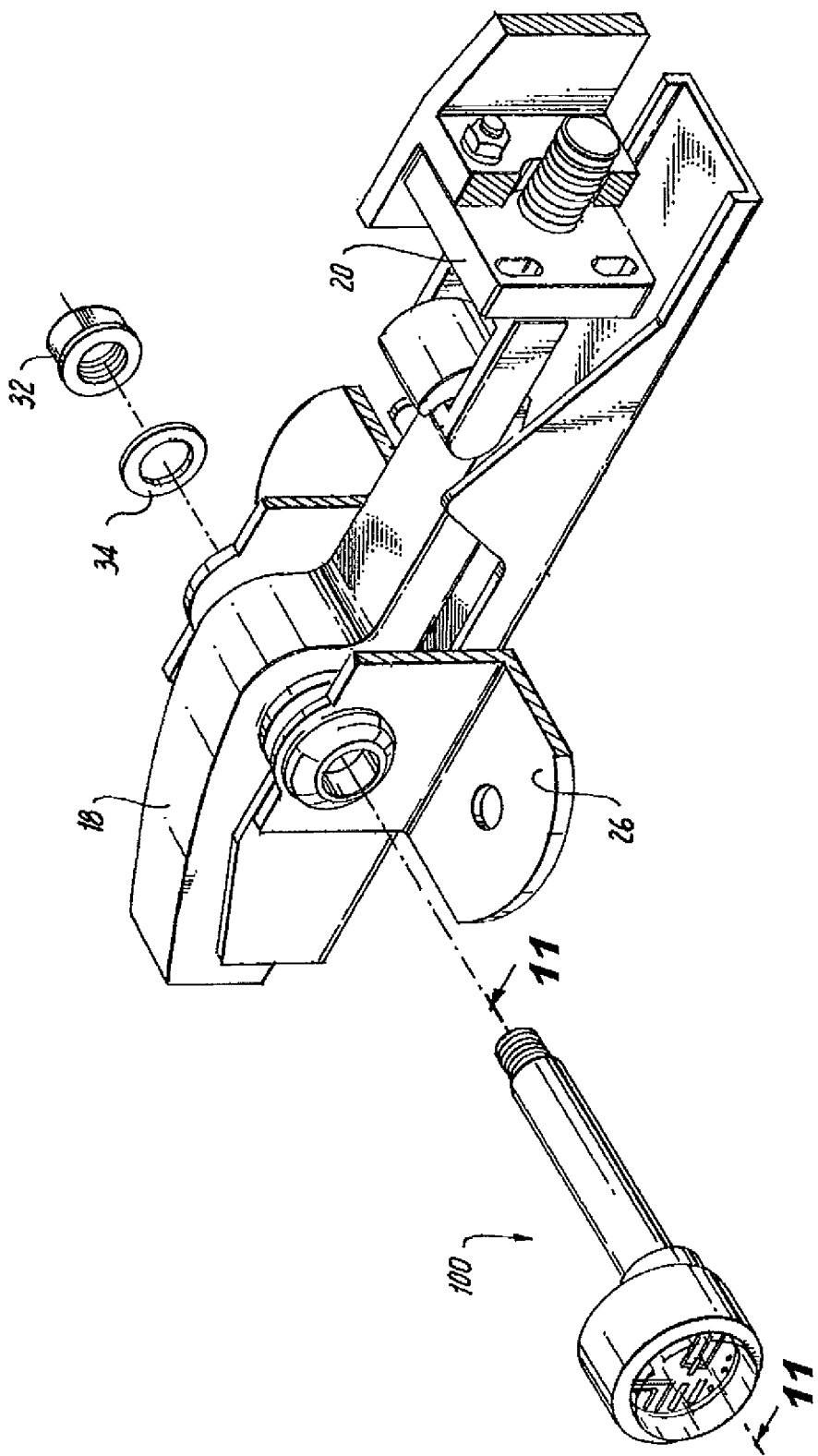
FIG. 6 is a partially cut away exploded view of the latch assembly and sensor of FIG. 5, showing the sensor removed from the latch assembly, wherein part of the clevis components are cut away for clarity.
Figure 9:
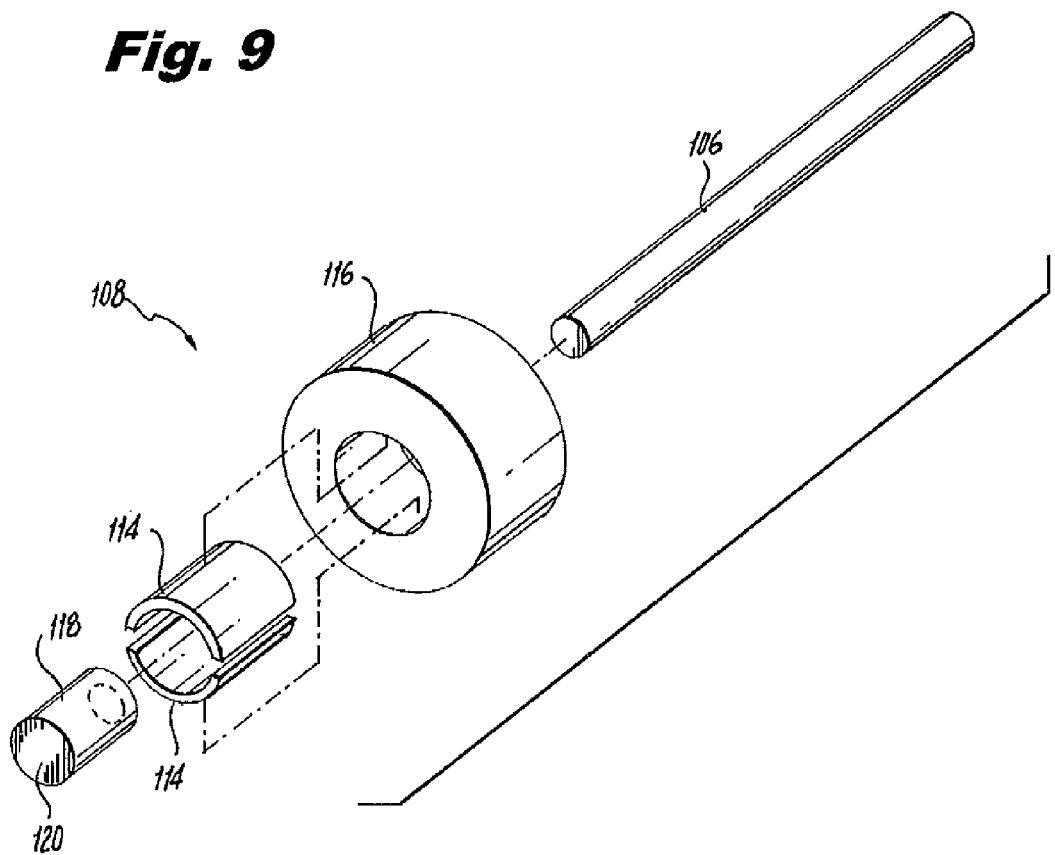
FIG. 9 is an exploded view of a portion of the sensor of FIG. 5, showing the inner and outer capacitor plates.

There are a few basic latch designs that are well accepted and are approved by government regulatory bodies for use in aircraft. Therefore it is desirable to provide a system that can sense the state of a latch without requiring significant modification of the latch itself. In typical latch designs, the latch mechanism hinges on a bolt or pin as it engages and disengages the hook and pin components. As indicated in FIGS. 5-6, latch 18 pivots about sensor 100, which is configured to detect whether or not hook 18 and pin component 20 are engaged with one another. As indicated in FIG. 6, sensor 100 passes through the clevis portion of bracket 26 and through latch 18 and is secured using threaded nut 32 and washer 34. Washer 34 is a spring washer for maintaining axial location for consistency in readings provided by sensor 100.

Those skilled in the art will readily appreciate that the latch configuration, including the location of sensor 100 in latch 18 and bracket 26 are exemplary, as is the securement of sensor 100 by threaded nut and washer 34, and that any other suitable latch configuration or securement can be used without departing from the spirit and scope of the invention. For example, sensor 100 could be mounted to pin component 20 in place of pin 24, so hook 18 could be secured directly to pin 102 of sensor 100 to latch the cowl doors securely.

With reference now to FIGS. 7-12, sensor 100 includes a pin 102 having an axial interior bore 104 defined through a portion of its length, with several varying diameters to accommodate core pin 106 and other components as described below. A core pin 106 is mounted axially within interior bore 104 of pin 102 and is spaced radially inwardly from interior bore 104 for relative displacement with respect to pin 102. Interior bore 104 extends only along a portion of the length of pin 102. Core pin 106 is mounted to the interior bore 104 in an intermediate portion of pin 102 between the ends thereof. In this manner, core 106 is cantilevered within bore 104 of pin 102.

Capacitor 108 is provided at one end of core pin 106 and bore 104. Outer capacitor plates 114 are mounted internal to ceramic ring 116, the assembly being mounted within bore 104 substantially concentric to inner capacitor plate 118 in ceramic ring 116. The capacitor plates 114, 118 and the relative displacement of core pin 106 and bore 104 are described in greater detail below with reference to FIGS. 15-16. Capacitor 108 is electrically connected to circuit boards 110, which are powered by battery 112, by way of electrically conductive pins 117. Circuit boards 110 include an ASIC (application-specific integrated circuit) connected to produce signals indicative of the state of latch 18 based on input from capacitor 108, however, any suitable type of circuitry can be used without departing from the spirit and scope of the invention. An exemplary battery 112 can power sensor 100 for about five years, and sensor 100 and/or battery 112 can thus be replaced as part of a typical routine maintenance.

Circuit boards 110 and battery 112 are enclosed within electronics housing 130 on an end of pin 102 proximate capacitor 108. Electronics housing 130 is eccentric with respect bore 104 and of pin 102. It is not necessary for electronics housing 130 to be eccentric, but the eccentric configuration can be used advantageously to accommodate tight fitting latch geometries. The interior space defined by electronics housing 130 and bore 104 is hermetically sealed by seal 131 sealing between electronics housing 130 and window 124. The sealing can instead be achieved by welding a radome assembly to housing 130 as described in more detail below.

Figure 10:
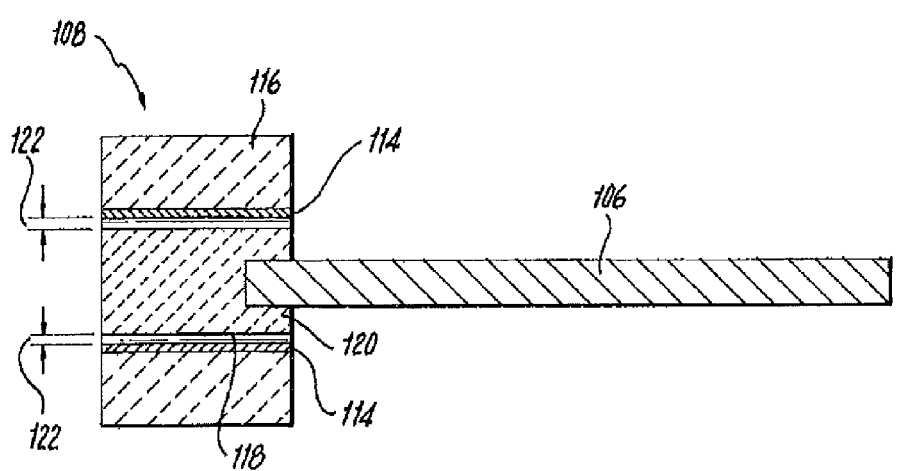
FIG. 10 is a cross-sectional side elevation view of a portion of the sensor of FIG. 5, showing the gap between the inner and outer capacitor plates.
Figure 11:
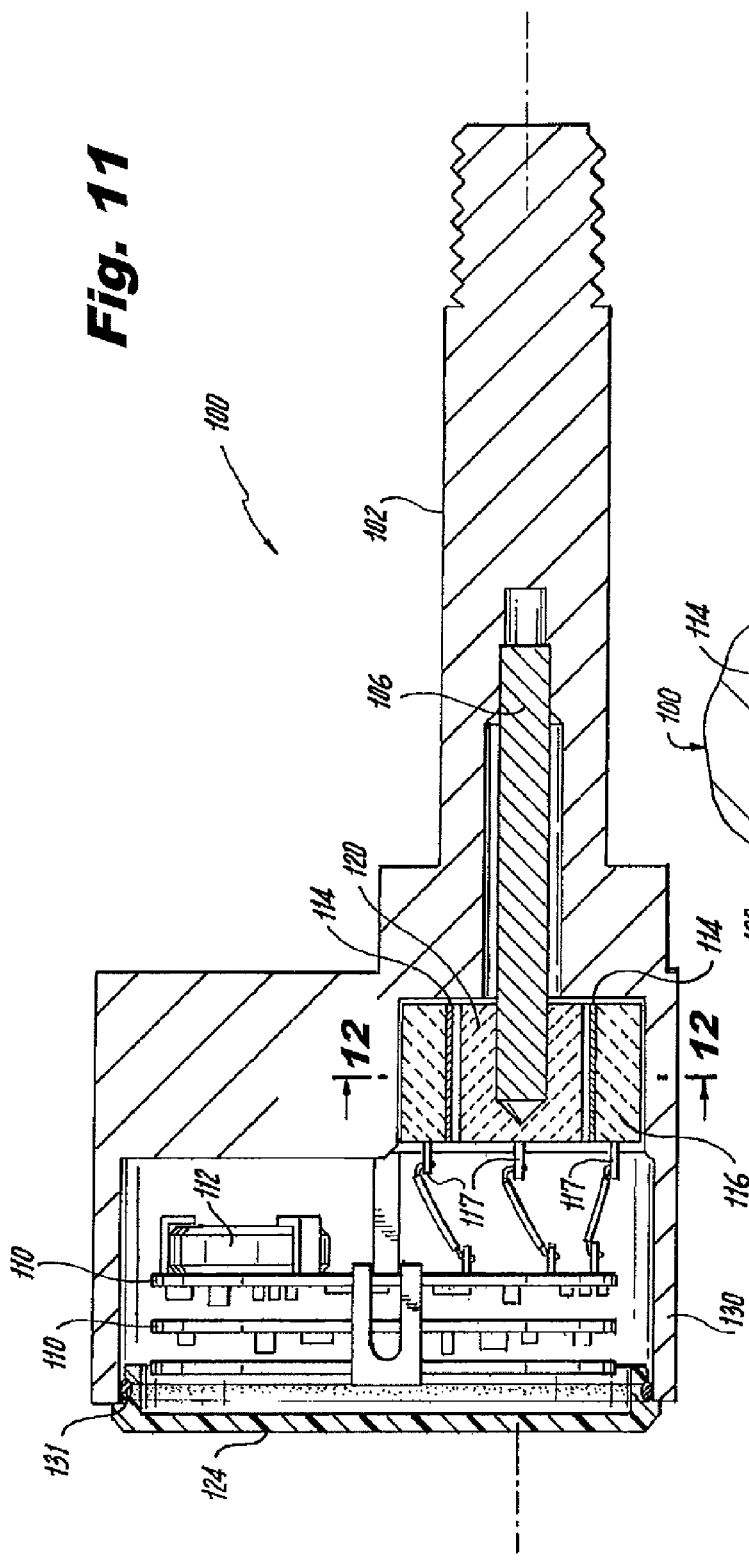
FIG. 11 is a cross-sectional side elevation view of the sensor of FIG. 5, showing the internal components assembled, with the pin in a load free state.
Figure 12:
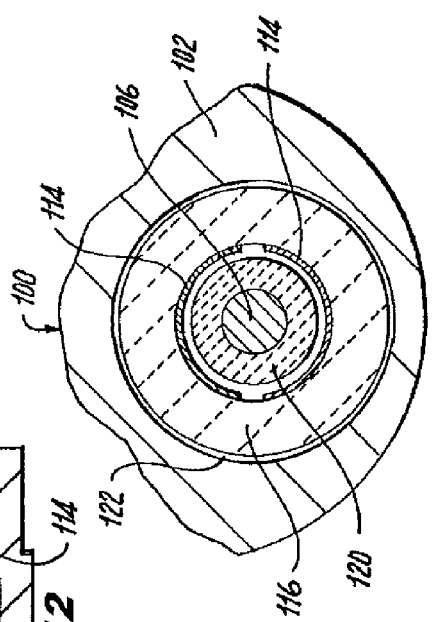
FIG. 12 is a cross-sectional end view of a portion of the sensor of FIG. 5, showing the cross-section through the capacitor as indicated in FIG. 11.
Figure 13:
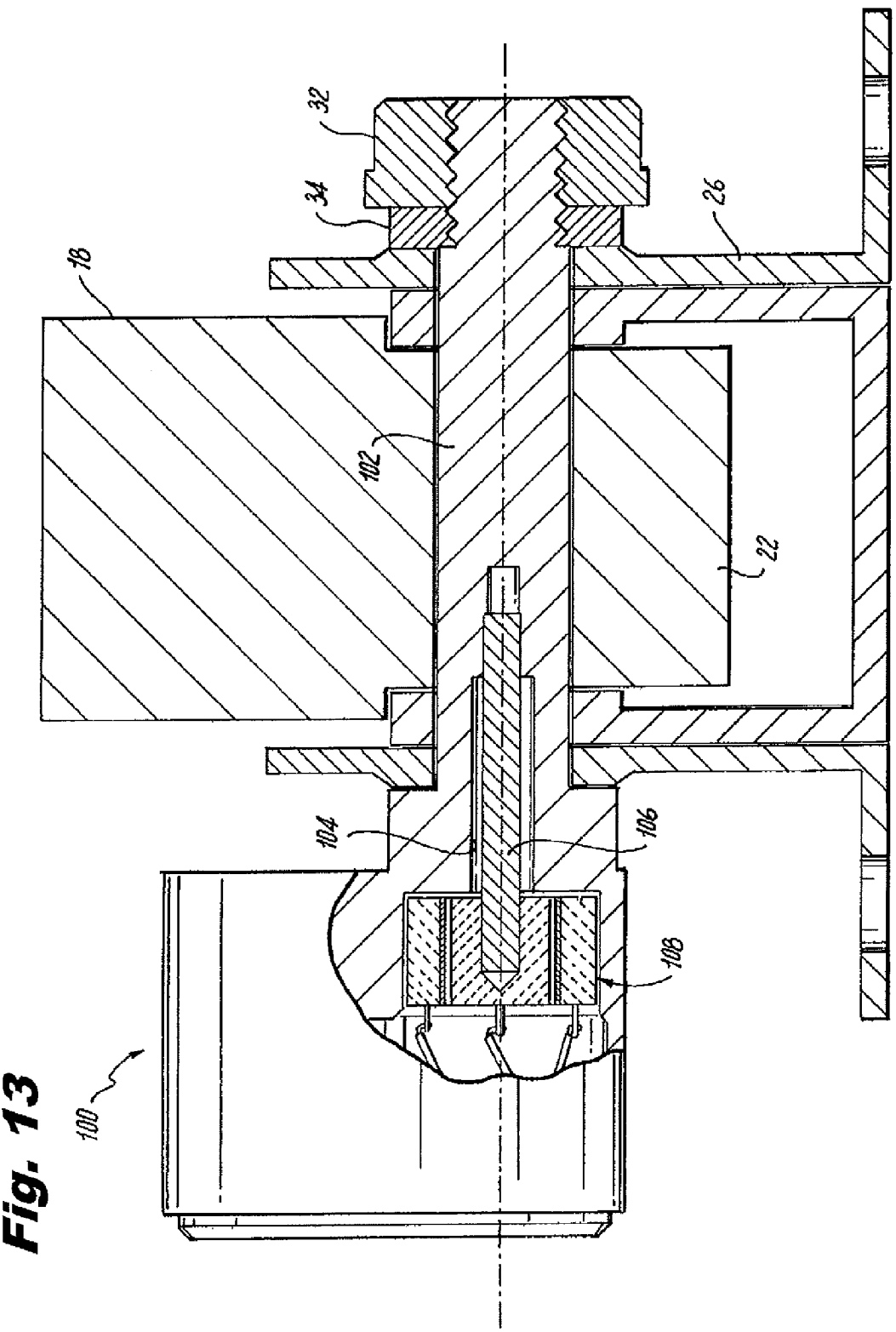
FIG. 13 is a partial cross-sectional elevation view of the latch assembly and sensor of FIG. 5, showing the alignment of the clevis, latch hook, and core pin.

Referring now to FIGS. 9-12, capacitor 108 includes a pair of separate outer capacitor plates 114 mounted to pin 102 by way of ceramic ring 116, which is mounted to bore 104 of pin 102. An inner capacitor plate 118 is formed on ceramic capacitor core 120 by metallization. Capacitor core 120 is mounted to core pin 106. A gap 122 separates capacitor plates 114 from inner capacitor plate 118. When no load is acting on pin 102, gap 122 is substantially uniform around its circumference, as shown in FIGS. 10 and 12. However, those skilled in the art will readily appreciate that gap 122 could be configured to be non-uniform in the unstressed state of sensor 100, which could be calibrated accordingly, without departing from the spirit and scope of the invention.

Figure 14:
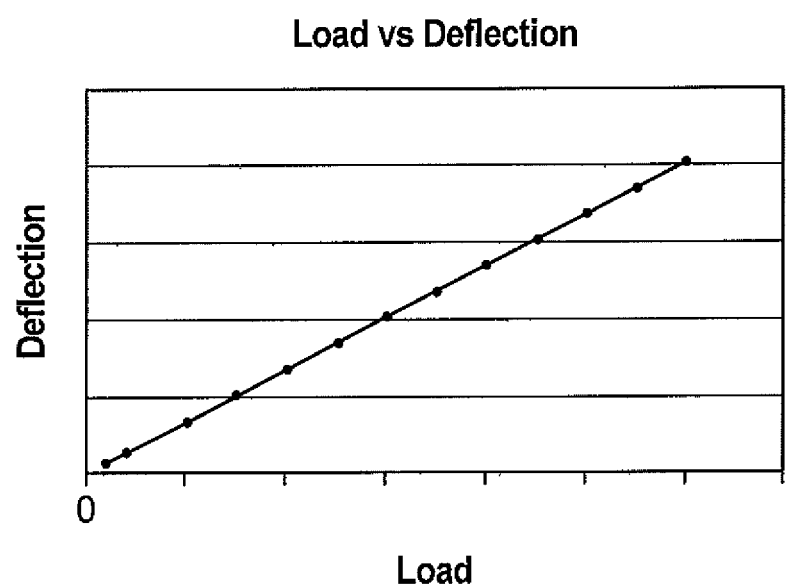
FIG. 14 is a graph showing a plot of load versus deflection at the capacitor plates for an exemplary embodiment of sensor constructed in accordance with the present invention.
Figure 15:
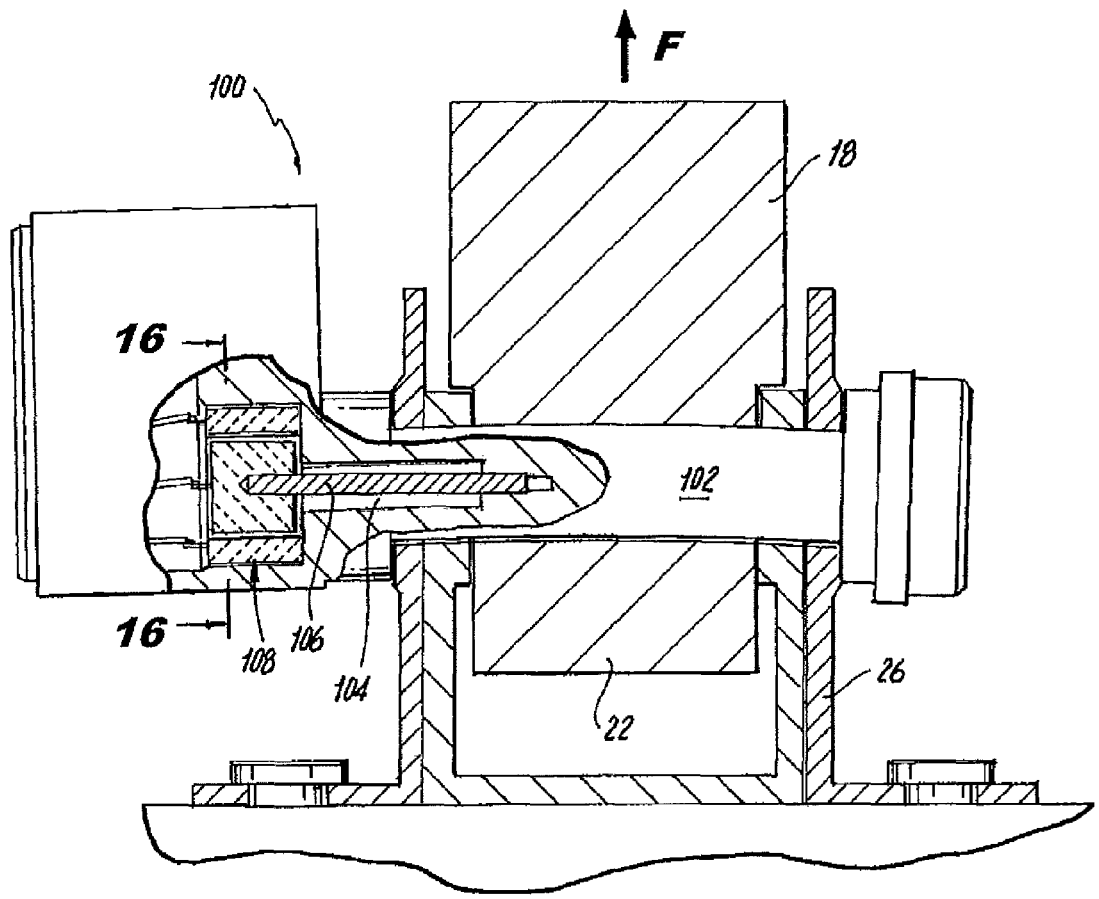
FIG. 15 is a partial cross-sectional elevation view of the latch assembly and sensor of FIG. 5, showing the bending of the pin under a load "F" of the latch in the secured state, with the core pin off-center in the axial interior bore, wherein the deflection is exaggerated for clarity.
Figure 16:
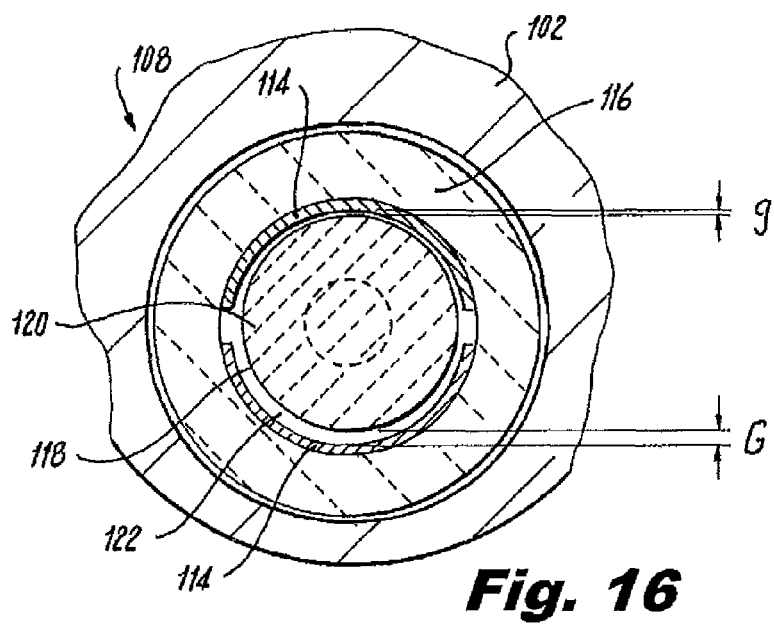
FIG. 16 is a cross-sectional end view of a portion of the sensor of FIG. 16, showing the changes in the gap between the capacitor plates when the pin is bent.

Referring now to FIGS. 13-16, sensor 100 is shown mounting latch 18 to bracket 26 where pin 102 is used, e.g., in lieu of a bolt, as a securing member for mounting latch 18 to bracket 26. When latch 18 is unsecured (unlatched), there is little or no load acting on pin 102, and gap 122 is substantially uniform as described above and as shown in FIG. 13. When latch 18 is fully engaged with pin 24 (fully latched), there is a significant load acting on pin 102, as indicated by the arrow "F" in FIG. 15. Under this load, pin 102 bends under the shearing stress between hook 22 of latch 18 and the clevis portion of bracket 26, as shown in FIG. 15 which shows the bending of pin 102 exaggerated for clarity. Since core 106 is free to move relative to bore 104, and since core 106 remains rigid even when pin 102 is bent under the load "F", there is a relative displacement of core 106 within bore 104. This relative displacement is greatest at the end of core 106 at capacitor 108. This displacement causes gap 122 between capacitor core 120 and capacitor plates 114 to be uneven, as shown in FIG. 16. FIG. 14 shows a plot of displacement within capacitor 108 as a function of load acting on pin 102.

When sensor 100 is properly aligned to sense load "F", capacitor core 120 will move toward one capacitor plate 114, e.g. the upper plate 114 as oriented in FIG. 16 and indicated by reduced gap "g", and will move away from the opposite capacitor plate 114, e.g., the lower plate 114 as oriented in FIG. 16 and indicated by the increased gap "G". In short, relative displacement of core 106 and pin 102 due to external loading on the pin, such as when latch 18 is loaded or latched to pin 24, results in relative displacement of the inner and outer capacitor plates 118, 114.

Capacitor plates 114 are substantially semi-cylindrical in profile, are aligned axially with capacitor core 120, and are spaced substantially evenly from capacitor core 120 in the radial direction when no load is present. Capacitor core 120 is metalized to form inner capacitor plate 118. The circumferential separation between the two capacitor plates 114 allows for differences in capacitance to be created when capacitor core 120 is displaced. Without this separation, even if capacitor core 120 were displaced, an electrical connection between capacitor plates 114 would cause the changes in capacitance from one side to the other of gap 122 to be neutralized, rather than being added together constructively as described below with reference to FIG. 18.

Figure 17:
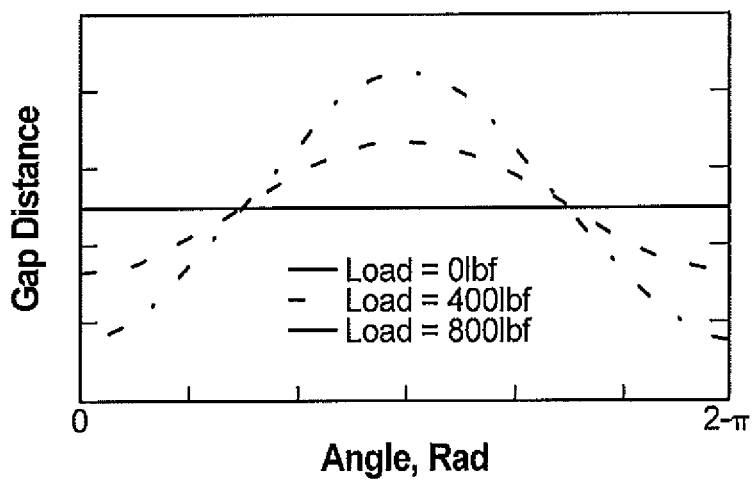
FIG. 17 is a graph showing a plot of the size of the gap between the capacitor plates as a function of location around the gap in the capacitor of an exemplary embodiment of a sensor constructed in accordance with the present invention, wherein gaps for three different loads are plotted.
Figure 18:
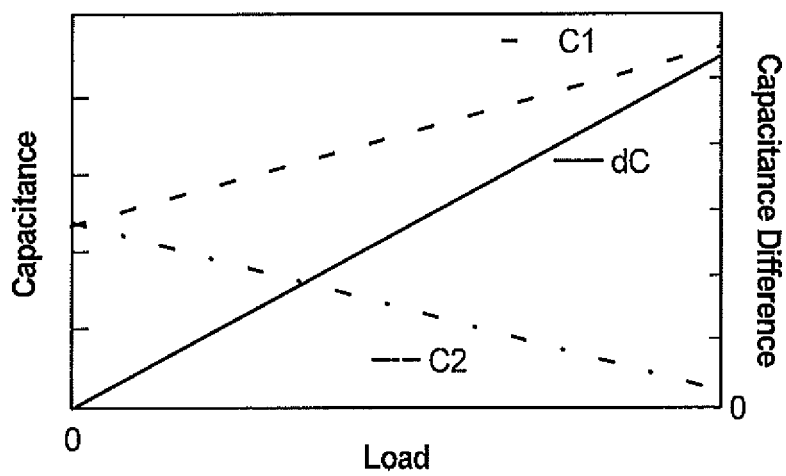
FIG. 18 is a graph showing a plot of capacitance as a function of load for an exemplary embodiment of a sensor constructed in accordance with the present invention, wherein lines are plotted for two opposed outer capacitor plates, and third line is plotted to show the constructively combined capacitance difference of both outer capacitor plates.

The capacitance measured at each capacitor plate 114 will therefore differ when load "F" acts on pin 102, and this difference in capacitance can be determined in the circuits of circuit boards 110. FIG. 17 shows the variance in gap 122 for an exemplary sensor 100, as a function of circumferential position for three different loads. While it is contemplated that only one capacitor plate 114 could be used, an advantage of using two capacitor plates 114 is that the change in capacitance measured at each plate 114 can be measured differentially to increase signal strength, as indicated by the plot in FIG. 18. In other words, as the capacitance at one capacitor plate 114 decreases under deflection of pin 102, e.g. as in line C2 in FIG. 18, the capacitance of the other capacitor plate 114 increases, e.g., as shown by line C1 in FIG. 18, the relative change in capacitance for both capacitor plates combined, e.g., as shown by line dC in FIG. 18, has a greater magnitude than that of either capacitor plate 114 individually. Using two capacitor plates in this manner thus allows for greater signal strength. Taken ratiometrically where the decreasing capacitance is in the denominator, the relative increase in sensitivity can be even greater.

Figure 19:
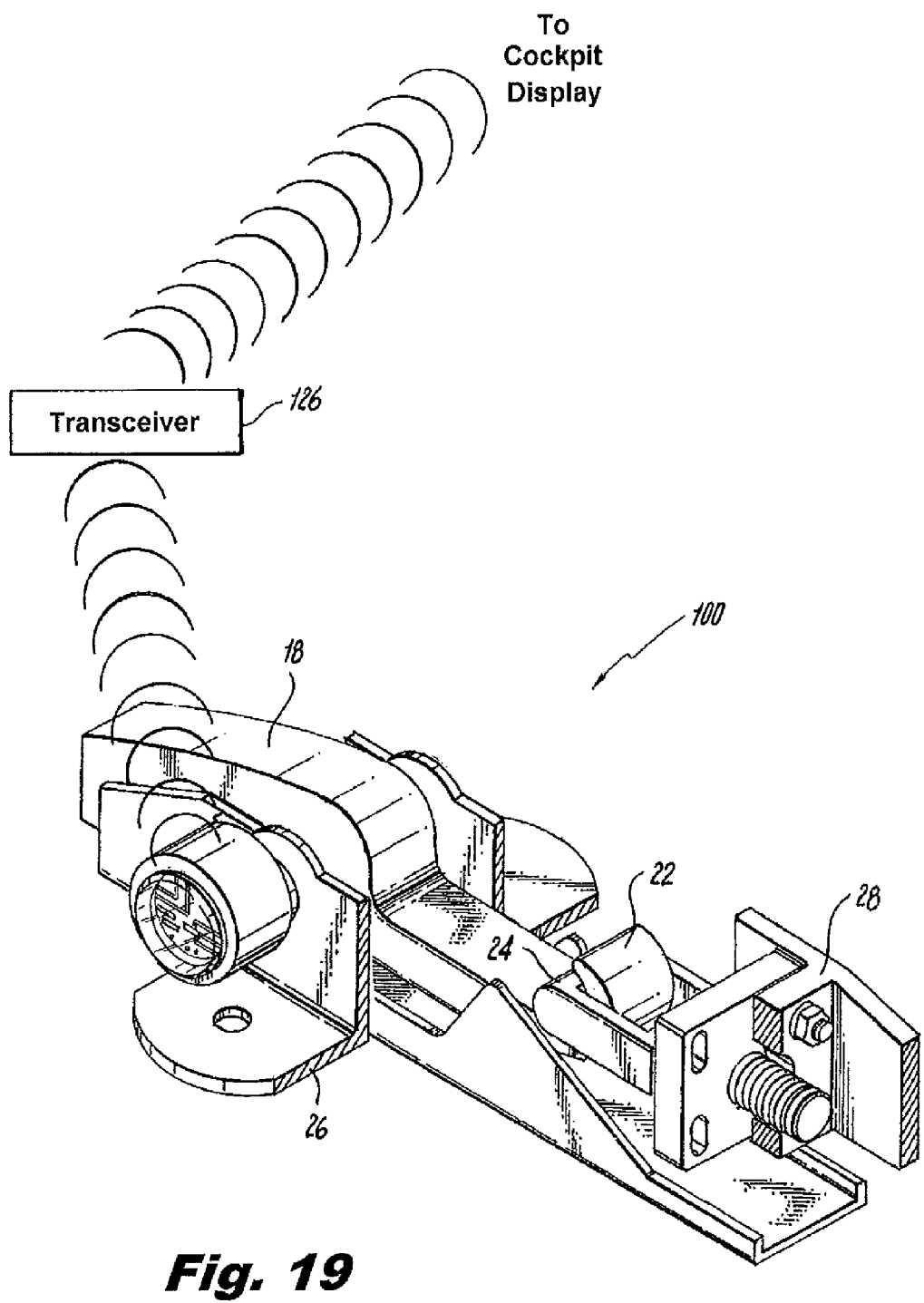
FIG. 19 is a schematic view of a system constructed in accordance with the present invention, showing a signal between the sensor of FIG. 5 and a transceiver, and showing a corresponding signal between the transceiver and an indicator in the cockpit of the aircraft.
Figure 20:
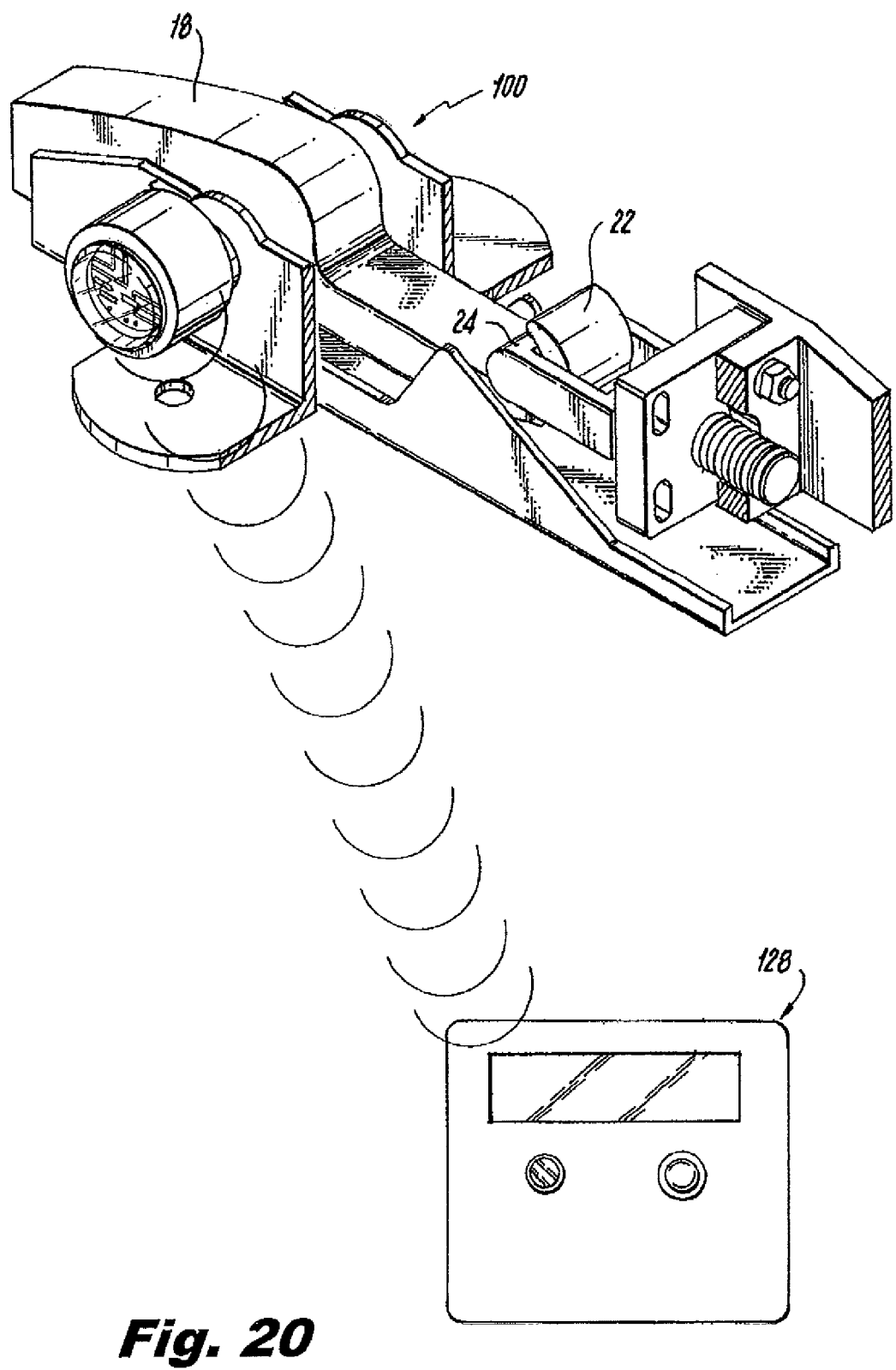
FIG. 20 is a schematic view of a system constructed in accordance with the present invention, showing a direct signal between the sensor of FIG. 5 and a terminal for monitoring latch status.

Referring now to FIGS. 19-20, capacitor 108 is connected to the electrical circuitry in circuit boards 110, which produce signals indicative of external loading on pin 102 based on relative displacement of capacitor plates 114 and capacitor core 120. Any suitable signal conveyance can be used. For example, in sensor 100, an infrared transparent window 124 (see FIGS. 7 and 11) seals the interior space of sensor 100. An infrared LED mounted to one of circuit boards 110 can be used to transmit an infrared signal to a nearby transceiver 126, which can then transmit a signal via wires or wirelessly to a remote location such as the cockpit as in FIG. 19, a ground station, and/or external indicator on the aircraft. Transceiver 126 and the signals in FIG. 19 are shown schematically, and any suitable location for transceiver 126 can be used without departing from the spirit and scope of the invention. Sensor 100 could also be used to send infrared signals directly to a ground based terminal without a transceiver. Another example is shown schematically in FIG. 20, in which sensor 100 transmits wireless radio frequency signals directly from circuit board 110 to a ground based terminal 128, which ground crew can consult to verify whether latch 18 is secured. Radio frequency signals can similarly be sent directly to the cockpit.

A further example is where radio frequency signals from circuit board 110 are received by a transceiver 126 mounted in the nacelle or other remote location around the engine. Further, multiple latch sensors could communicate to a single transceiver in multiplex or other suitable fashion. The transceiver can then communicate to ground crew and/or the cockpit. Those skilled in the art will readily appreciate that any suitable wired or wireless signal conveyance can be used in addition to, in combination with, or in lieu of the infrared or radio frequency means described above.

Exemplary materials for constructing sensor 100 include medium carbon alloy steel for the main sensor housing of pin 102 and electronics housing 130. Other exemplary materials include 4340 steel that is heat treated to 90,000 psi yield. Other alloys such as 4140, 8640, per the MIL standards, or any other suitable ferrous or non-ferrous materials can be used without departing from the spirit and scope of the invention. Core pin 106 can be a hardened dowel pin or any suitable cylindrical element which is press fit or otherwise bonded into the interior end of bore 104 in pin 102. Ring component 116 and capacitor core 120 can be of any suitable insulating material such as a polymer or ceramic. It is advantageous for ring component 116 to be of a dielectric material so that capacitance to voltage ASICs can be used which would otherwise not function with a grounded capacitor plate. This allows all capacitance elements in sensor 100 to be "floating." Other electronics which function with a grounded capacitor plate would permit capacitor core 120 or ring 116 to be metallic, but not both. If the inner capacitor plate, e.g., 118, were chosen to be grounded, capacitor core 120 could be dispensed with along with its capacitor plate 118, using instead the metal surface of core pin 106 as an inner capacitor plate. It will be readily apparent to those skilled in the art that various combinations of materials and electronic circuitry can be utilized without departing from the spirit and scope of the invention.

Ceramic materials are advantageous for this application as they can be metalized, e.g., as capacitor core 120 is metalized to form inner capacitor plate 118, and have good strength and stability over a wide temperature range. A medium alumina, such as 95% alumina, has a thermal expansion coefficient fairly close to that of carbon steel and can therefore be matched to the main housing of sensor 100 with respect to thermal expansion and contraction. Ring 116 can be metalized and brazed to pin 102, or can be mounted in any other suitable manner.

Precise installation of ring 116 can provide an even gap 122 all around capacitor core 120 when pin 102 is not deflected. An exemplary dimension for gap 122 is 0.005 inches between inner and outer capacitor plates 118, 114. One exemplary way of accomplishing this is by applying a high temperature epoxy around the outer diameter of ring 116. A shim of a suitably soft material such as biaxially-oriented polyethylene terephthalate (boPET) or acetate, etc., having a thickness equal to the desired thickness of gap 122, e.g., 0.005 inches, can be inserted between capacitor core 120 and ring 116 while the epoxy cures, and then removed. Pins 117 can be brazed onto, epoxied onto with conductive epoxy, or otherwise provided on, the metalized ceramic components of capacitor 108 to communicate electrical signals from capacitor 108 to circuit boards 110. Capacitor plates 114 can be metalized onto the inner bore of ring 116, with the separations between capacitor plates 114 maintained. Any other suitable attachment method can be used for mounting or forming the capacitor plates without departing from the spirit and scope of the invention.

Referring now to FIGS. 21 and 22, another exemplary embodiment of a sensor 200 is shown. Sensor 200 includes a pin 202, internal bore 204, core pin assembly 206, capacitor 208, circuit boards 210, battery 212, and window 224 much as described above with respect to sensor 100. Electronics housing 230 is shown concentric with bore 204 and pin 202, unlike the eccentric configuration of sensor 100.

With reference now to FIGS. 23-26, another exemplary embodiment of a sensor 300 is shown. Sensor 300 includes a pin 302, circuit boards 310, battery 312, electronics housing 330, and window 324 much as described above with respect to sensor 200. Unlike bore 104, which only extends part of the way through pin 102, as shown in FIG. 11, bore 304 runs the entire length of pin 302. Core pin 306 extends through the length of bore 304 and is mounted to the end of pin 302 with a threaded fastener 307. Core pin 306 is designed such that a press fit is accomplished by drawing the core pin 306 into the tight fitting portion 304b of bore 304 upon tightening threaded fastener 307. For security, the nut can be welded to the end of pin 302. Core pin 306 is thus cantilevered at one end of pin 302, which enhances the amount of deflection within capacitor 308 at the opposite end of pin 302 compared to the deflection that would result if core pin 306 were mounted in the middle of pin 302, thus providing increased sensitivity to smaller loads.

Capacitor 308 includes three separate outer capacitor plates 314. Each of these capacitor plates 314 is electrically connected to circuit boards 310. Core pin 306 is metal and is grounded. Circuit boars 310 include single sided electronics. Therefore, the end portion 318 of core pin 306 functions as an inner capacitor plate that is separated from outer capacitor plates 314 by gap 322.

The capacitor plates 314 are generally semi-circular in profile, except that they subtend about one third of a circle instead of about one half of a circle as in plates 114, 214 described above. Since plates 314 are aligned axially with the end of core pin 306, capacitor 308, connected to the electrical circuitry of circuit boards 310, is capable of producing signals indicative of external loading on the pin based on the relative displacement of the capacitor plates 314, 318. Since the relative displacement of core pin 306 in bore 304 can be sensed separately by three different outer capacitor plates 314, there are three separate components of displacement that can be measured. This can provide information not only on the magnitude of the load, but also its angular direction normal to the longitudinal axis of pin 302, as long as the orientation of sensor 100 is known, e.g., by calibration and/or alignment during installation.

Those skilled in the art will readily appreciate that sensor 300 could instead use a ceramic capacitor assembly such as such as capacitors 108, 208 described above. Moreover, sensor 300 could be reconfigured use only two outer capacitor plates 314, either in the more compact configuration with core pin 306 grounded, or with a ceramic capacitor assembly as described above. Those skilled the art will readily appreciate that any suitable number of outer capacitor plates can be used without departing from the spirit and scope of the invention. The greater the number of circumferentially distributed outer capacitor plates utilized, the greater is the resolution of load orientation that can be detected. In certain applications, installation Of the pin in a random or arbitrary direction rotationally may be desired. In such a applications, sensor 300 will still provide proper reading of the load, however it will not permit determination of direction of load without calibration.

Figure 27:
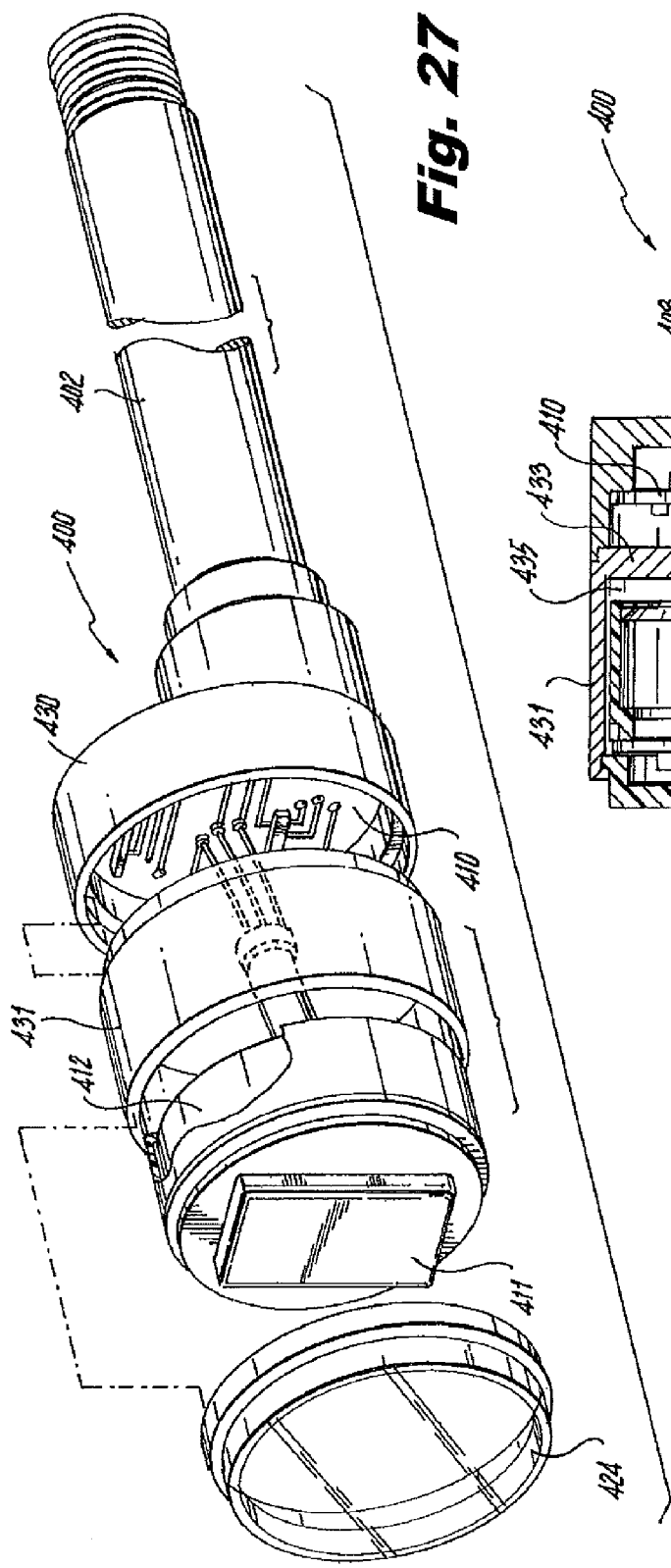
FIG. 27 is an exploded perspective view of another exemplary embodiment of a sensor constructed in accordance with the subject invention, showing a radome battery assembly with a bulkhead that hermetically seals the capacitor within the sensor.
Figure 28:
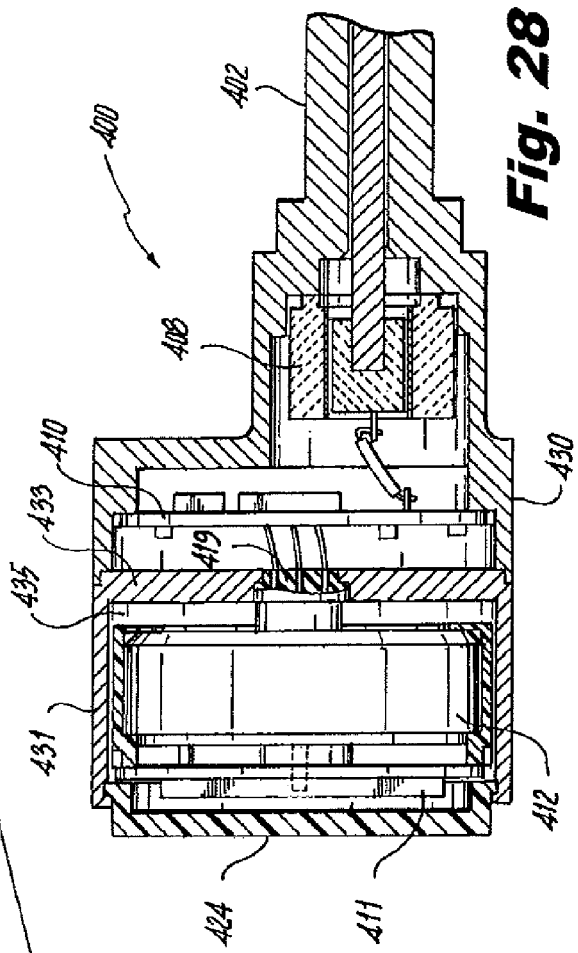
FIG. 28 is a cross-sectional side elevation view of a portion of the sensor if FIG. 27, showing the wireless transmitter connected to the circuitry through the hermetically sealed bulkhead.

With reference to FIGS. 27 and 28, another exemplary embodiment of sensor 400 is shown, having a pin 402, electronics housing 430, capacitor 408, circuit board 410, and battery 412 much as described above with respect to sensors 100, 200, and 300. Battery 412 and wireless transmitter 411 are assembled in the interior compartment 435 of bulkhead component 431, which is separated from capacitor 408 by bulkhead portion 433 of bulkhead component 431, which is hermetically sealed to housing 430, e.g., by welding or the like. Signals from capacitor 408 and circuit board 410 are conveyed to the transmitter 411 through an insulating feed through 419 in bulkhead portion 433 of bulkhead component 431. This allows the battery cavity (compartment 435) to be non-hermetic and openable for battery replacement while keeping the capacitor assembly in a protected, hermetically sealed environment. Wireless transmitter 411 can transmit signals indicative of the state of pin 402 through removable radome 424.

Referring now to FIGS. 29 and 30, another exemplary embodiment is shown as sensor 500 where the battery and radome, .e.g., as described for sensor 400 above, are removed and replaced with a wire connector 525. Sensor 500 includes a pin 502, electronics housing 530, capacitor 508, circuit board 510, and hermetically sealed bulkhead component 531 with insulating feed through 519 through bulkhead portion 533 thereof, much as described above with respect to sensor 400. Connector 525 is mounted in cap 524, which is affixed to bulkhead component 531 by welding or any other suitable technique. Connector 525 is in electrical communication with circuit board 510 by way of feed through 519 and a flex circuit 521. In this manner, connector 525 can be connected to one or more wires, e.g., in cable 527, for supplying power to sensor 500 and for conveying signals indicative of the state of pin 502 via wire in applications where wireless sensor capability is not needed or desired.

It has been shown that the length of the core pin can vary relative to the length of the respective pin. It is advantageous to dimension the core pin for a given application to impart a resonant frequency on the core pin that will avoid resonating with any typical operating vibrations. Those skilled in the art will readily appreciate how to configure a core pin for a particular application to reduce resonating vibrations in the capacitor. For example, typical vibration frequencies of aircraft engines are about 3,000 Hz, and typical airframe vibration frequencies are about 2,000 Hz. A core pin with a natural frequency of 3,800 Hz, for example, would avoid resonating at either of these common frequencies.

Sensors in accordance with the present invention can be used in any suitable latch application. The pin in a nacelle latch, for example, can take a load applied during latching and in flight as aerodynamic loads become large. It is not uncommon, for example, for loads of 12,000 lbf to be applied to the pin. However, typical latching forces are only between about 400 and 800 lbf, for example. Due to the capacitor configuration, which is sensitive to small displacements, sensors in accordance with the present invention are sensitive to the relatively small latching loads, while the pin portions are strong enough to handle the large in flight loads. For example, in an exemplary embodiment, a load of 800 lbf on the pin changes the capacitor gap by about 3 microns (about 120 millionths of an inch). The capacitance measured in this example is about 100 fFD. With a rest capacitance of around 3 pFD, this gives about 3% gain at 800 lbf or about 1.5% gain at a threshold load of 400 lbf. This is well within the resolution of typical capacitance to voltages ASICs.

Those skilled in the art will readily appreciate that sensors constructed in accordance with the present invention can be installed into existing latches as retrofits, or can be incorporated in new latches. Those skilled in the art will also readily appreciate that the exemplary materials and configurations described herein can be varied from application to application without departing from the spirit and scope of the invention.

While described herein in the exemplary context of latch state detection, those skilled in the art will readily appreciate that sensors in accordance with the invention can be used in any other suitable application without departing from the spirit and scope of the invention. For example, the advantages of the sensor can be gained in applications such as devises, toggles, or the like, where shear loads are induced in the pin and strains and displacements are small in accessible areas.

The methods and systems of the present invention, as described above and shown in the drawings, provide for latch sensors with superior properties including improved sensitivity and reliability. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A sensor for monitoring external loads acting on a pin assembly comprising:
    a) a pin having an axial interior bore defined therein and having a length defined from a first end to an opposed second end thereof;
    b) a core pin mounted axially aligned within the interior bore of the pin and being spaced radially inwardly with a radial clearance from the interior bore for relative displacement with respect to the pin; and
    c) a capacitor having an inner capacitor plate mounted to the core pin, and a plurality of outer capacitor plate mounted to the pin, each outer capacitor plate of the plurality of outer capacitor plates being aligned axially with the inner capacitor plate such that relative displacement of the core and the pin due to external loading on the pin results in relative displacement of the inner and outer capacitor plates, and wherein the plurality of outer capacitor plates are configured to be connected to an electrical circuit to produce signals indicative of external loading on the pin based on the relative displacement of the core pin and the pin.

2. A sensor as recited in claim 1, wherein the interior bore extends only along a portion of the length of the pin, wherein the core pin is mounted to the interior bore in an intermediate portion of the pin between the first and second ends thereof, and wherein the capacitor is located proximate one end of the pin.

3. A sensor as recited in claim 1, wherein the core pin is cantilevered within the interior bore of the pin.

4. A sensor as recited in claim 1, wherein each of the outer capacitor plates are semi-cylindrical in cross-section and are aligned axially with the inner capacitor plate.

5. A sensor as recited in claim 1, wherein the outer capacitor plates are spaced apart evenly circumferentially.

6. A sensor as recited in claim 1, further comprising an electronics housing on an end of the pin proximate the capacitor for holding electronic components in electrical communication with the capacitor.

7. A sensor as recited in claim 6, wherein the electronics housing is axially eccentric with respect to the axial interior bore of the pin.

8. A sensor as recited in claim 1, wherein the core pin is metallic and is mounted to the axial interior bore of the pin with a press fit.

9. A sensor as recited in claim 8, further comprising a ceramic ring mounted to the pin, wherein the outer capacitor plates are mounted to the ceramic ring.

10. A latch for securing an engine nacelle on a gas turbine engine comprising:
    a) a latch pin mounted in a latch clevis, the pin having an axial interior bore defined therein and having a length defined from a first end to an opposed second end thereof;
    b) a latch hook operatively connected to the latch clevis for engaging the latch pin to secure the latch and for disengaging the latch pin to release the latch;
    c) a core pin mounted axially within the interior bore of the latch pin and being spaced radially inwardly from the interior bore for relative displacement with respect to the latch pin; and
    d) a capacitor having an inner capacitor plate mounted to the core pin, and a plurality of outer capacitor plate mounted to the latch pin, each outer capacitor plate of the plurality of outer capacitor plates being aligned axially with the inner capacitor plate such that relative displacement of the core and the latch pin due to engagement of the latch hook with the latch pin results in relative displacement of the inner capacitor plate and at least one of the plurality of outer capacitor plates, wherein the capacitor is configured and adapted to be connected to an electrical circuit to produce signals indicative of the latch hook engaging the latch pin based on the relative displacement of the inner capacitor plate and at least one of the plurality of outer capacitor plates.

11. A system for sensing external loads acting on a pin assembly comprising:
  a) a pin having an axial interior bore defined therein and having a length defined from a first end to an opposed second end thereof;
  b) a core pin mounted axially aligned within the interior bore of the pin and being spaced radially inwardly with a radial clearance from the interior bore for relative displacement with respect to the pin;
  c) a capacitor having an inner capacitor plate mounted to the core pin, and a plurality of outer capacitor plates mounted to the pin, each outer capacitor plate of the plurality of outer capacitor plates being aligned axially with the inner capacitor plate such that relative displacement of the core pin and the pin due to external loading on the pin results in relative displacement of the inner capacitor plate and at least one of the plurality of outer capacitor plates;
  d) an electrical circuit electrically connected to the inner capacitor plate and each of the plurality of outer capacitor plates to produce signals indicative of external loading on the pin based on the relative displacement of the inner capacitor plate and at least one of the plurality of outer capacitor plates; and
  e) a transmitter electrically connected to the electrical circuit to transmit the signals indicative of external loading on the pin.

* * * * *